(12) United States Patent
Sato

(10) Patent No.: US 8,553,241 B2
(45) Date of Patent: Oct. 8, 2013

(54) INFORMATION PROCESSING APPARATUS, INFORMATION PROCESSING METHOD, AND STORAGE MEDIUM FOR GENERATING PRINT DATA ACCORDING TO AN INSTRUCTION

(75) Inventor: Junko Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 12/966,332

(22) Filed: Dec. 13, 2010

(65) Prior Publication Data

US 2011/0141506 A1 Jun. 16, 2011

(30) Foreign Application Priority Data

Dec. 15, 2009 (JP) .................................. 2009-284298
Nov. 12, 2010 (JP) .................................. 2010-254122

(51) Int. Cl.
G06F 15/00 (2006.01)
G06K 1/00 (2006.01)
G06K 15/00 (2006.01)
G06F 3/12 (2006.01)

(52) U.S. Cl.
USPC ....................................... 358/1.12; 358/1.13

(58) Field of Classification Search
None
See application file for complete search history.

(56) References Cited

U.S. PATENT DOCUMENTS

2008/0218789 A1* 9/2008 Eldridge ...................... 358/1.15
2012/0320395 A1* 12/2012 Kuroda et al. ................. 358/1.9

FOREIGN PATENT DOCUMENTS

JP 3848172 B2 11/2006

* cited by examiner

*Primary Examiner* — Douglas Tran
(74) *Attorney, Agent, or Firm* — Canon U.S.A., Inc. IP Division

(57) ABSTRACT

An information processing apparatus includes a decision unit for deciding whether or not each of physical pages of a document file is unprintable based on whether or not an inserter is designated as a paper feed unit, a determination unit for determining whether or not printing of a document is designated for the physical page that is decided as an unprintable page by the decision unit, and a preview display unit for displaying a preview image that can discriminate the physical page determined that printing of the document is designated by the determination unit from the other pages.

9 Claims, 32 Drawing Sheets

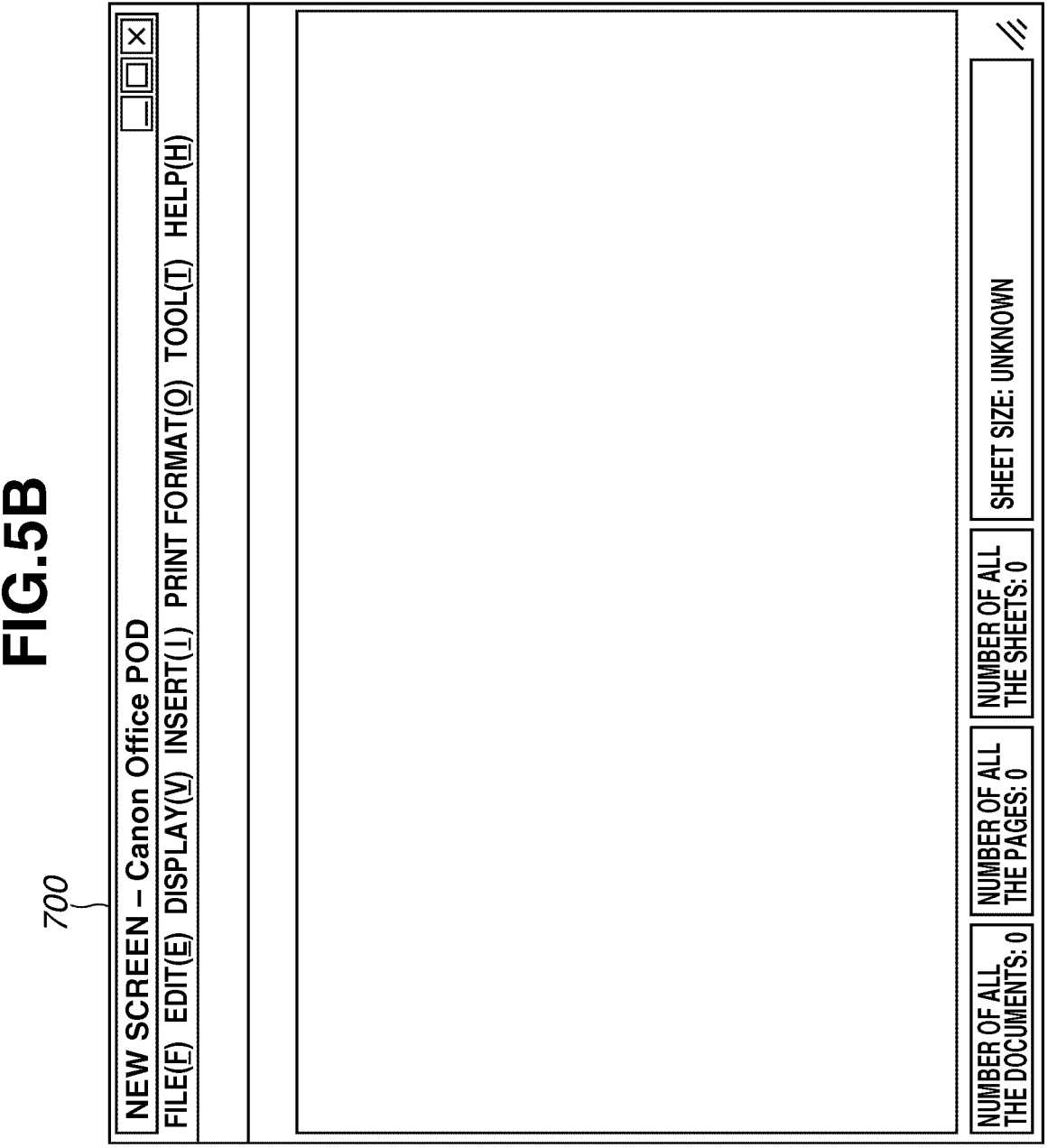

FIG.8A

COVER/INTERLEAF SETTING — 801

COMBINATION(C): NON ▼

METHOD FOR DESIGNATING SHEET OF COVER(F):
- ⦿ DESIGNATE IN PAPER FEEDING UNIT
- ○ DESIGNATE ACCORDING TO SHEET TYPE

PAPER FEEDING UNIT(P): INSERTER 1 ▼

☐ PRINT DOCUMENT ON ALSO COVER(L)

METHOD FOR DESIGNATING SHEET OF INDEX PAPER(B):
- ⦿ DESIGNATE IN PAPER FEEDING UNIT
- ○ DESIGNATE ACCORDING TO SHEET TYPE

PAPER FEEDING UNIT(R): PAPER DECK 3 ▼

FORMAT(M): A4 5 TABS ▼

TYPE(P): INDEX PAPER 1 (151~180gm2) ▼   [TEXT DETAILED SETTINGS (X)...]

☐ PRINT NAME OF CHAPTER ON INDEX TAB(T)

METHOD FOR DESIGNATING SHEET OF INTERLEAF(Y):
- ⦿ DESIGNATE IN PAPER FEEDING UNIT
- ○ DESIGNATE ACCORDING TO SHEET TYPE

PAPER FEEDING UNIT(E): INSERTER 1 ▼

☐ PRINT DOCUMENT ON ALSO INTERLEAF(O)

METHOD FOR DESIGNATING SHEET OF BACK COVER(V):
- ⦿ DESIGNATE IN PAPER FEEDING UNIT
- ○ DESIGNATE ACCORDING TO SHEET TYPE

PAPER FEEDING UNIT(U): INSERTER 1 ▼

☐ PRINT DOCUMENT ON ALSO BACK COVER(K)

[OK]  [CANCEL]  [APPLY(A)]  [HELP(H)]

FIG.8B

| COVER/INTERLEAF SETTING | ☒ |
|---|---|

COMBINATION(C): COVER ▼

METHOD FOR DESIGNATING  ⦿ DESIGNATE IN PAPER FEEDING UNIT
SHEET OF COVER(F):  ○ DESIGNATE ACCORDING TO SHEET TYPE

PAPER FEEDING UNIT(P): PAPER DECK 1 ▼

☑ PRINT DOCUMENT ON ALSO COVER(L) ~802

METHOD FOR DESIGNATING  ⦿ DESIGNATE IN PAPER FEEDING UNIT
SHEET OF INDEX PAPER(B):  ○ DESIGNATE ACCORDING TO SHEET TYPE

PAPER FEEDING UNIT(R): PAPER DECK 3 ▼

FORMAT(M): A4 5 TABS ▼

TYPE(P): INDEX PAPER 1 (151~180gm2) ▼   TEXT DETAILED SETTINGS (X)...

☐ PRINT NAME OF CHAPTER ON INDEX TAB(T)

METHOD FOR DESIGNATING  ⦿ DESIGNATE IN PAPER FEEDING UNIT
SHEET OF INTERLEAF(Y):  ○ DESIGNATE ACCORDING TO SHEET TYPE

PAPER FEEDING UNIT(E): INSERTER 1 ▼

☐ PRINT DOCUMENT ON ALSO INTERLEAF(O)

METHOD FOR DESIGNATING  ⦿ DESIGNATE IN PAPER FEEDING UNIT
SHEET OF BACK COVER(V):  ○ DESIGNATE ACCORDING TO SHEET TYPE

PAPER FEEDING UNIT(U): INSERTER 1 ▼

☐ PRINT DOCUMENT ON ALSO BACK COVER(K)

| OK | CANCEL | APPLY(A) | HELP(H) |

FIG.8E

| COVER/INTERLEAF SETTING | ☒ |
|---|---|

COMBINATION(C): [COVER/INTERLEAF/BACK COVER ▼]

METHOD FOR DESIGNATING SHEET OF COVER(F):
● DESIGNATE IN PAPER FEEDING UNIT
○ DESIGNATE ACCORDING TO SHEET TYPE

PAPER FEEDING UNIT(P): [INSERTER 1 ▼]

☑ PRINT DOCUMENT ON ALSO COVER(L)
    * IN A CASE WHERE AN INSERTER IS DESIGNATED AS A "PAPER FEEDING UNIT" FOR A COVER, THE DOCUMENT IS NOT PRINTED. HOWEVER, PREVIEW IS CONTINUOUSLY DISPLAYED.

METHOD FOR DESIGNATING SHEET OF INDEX PAPER(B):
● DESIGNATE IN PAPER FEEDING UNIT
○ DESIGNATE ACCORDING TO SHEET TYPE

PAPER FEEDING UNIT(R): [PAPER DECK 3 ▼]

FORMAT(M): [A4 5 TABS ▼]
TYPE(P): [INDEX PAPER 1 (151~180gm2) ▼]  [TEXT DETAILED SETTINGS (X)...]
☐ PRINT NAME OF CHAPTER ON INDEX TAB(T)

METHOD FOR DESIGNATING SHEET OF INTERLEAF(Y):
● DESIGNATE IN PAPER FEEDING UNIT
○ DESIGNATE ACCORDING TO SHEET TYPE

PAPER FEEDING UNIT(E): [INSERTER 2 ▼]

☑ PRINT DOCUMENT ON ALSO INTERLEAF(O)
    * IN A CASE WHERE AN INSERTER IS DESIGNATED AS A "PAPER FEEDING UNIT" FOR AN INTERLEAF, THE DOCUMENT IS NOT PRINTED. HOWEVER, PREVIEW IS CONTINUOUSLY DISPLAYED.

METHOD FOR DESIGNATING SHEET OF BACK COVER(V):
● DESIGNATE IN PAPER FEEDING UNIT
○ DESIGNATE ACCORDING TO SHEET TYPE

PAPER FEEDING UNIT(U): [INSERTER 3 ▼]

☑ PRINT DOCUMENT ON ALSO BACK COVER(K)
    * IN A CASE WHERE AN INSERTER IS DESIGNATED AS A "PAPER FEEDING UNIT" FOR A BACK COVER, THE DOCUMENT IS NOT PRINTED. HOWEVER, PREVIEW IS CONTINUOUSLY DISPLAYED.

[OK] [CANCEL] [APPLY(A)] [HELP(H)]

FIG.10B (ONE-SIDED)

FIG.10C (TWO-SIDED)

FIG.10D (ONE-SIDED)

FIG.10E (TWO-SIDED)

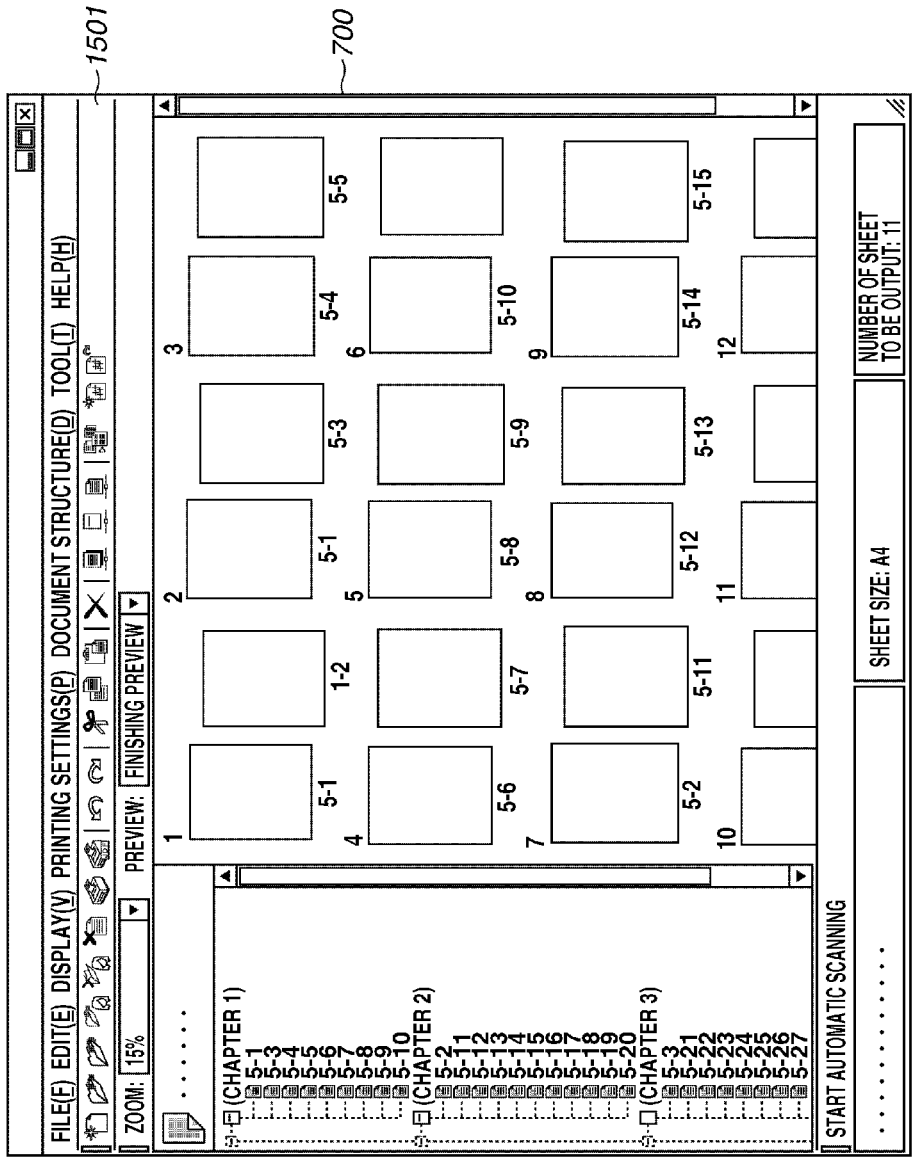

COVER (FRONT PAGE 1) | FIRST PAGE OF BODY OF BOOK | SECOND PAGE OF BODY OF BOOK | ... | COVER (FRONT PAGE 4)

← FIRST PAGE OF BODY OF BOOK

← COVER, COVER

← FIRST PAGE OF BODY OF BOOK

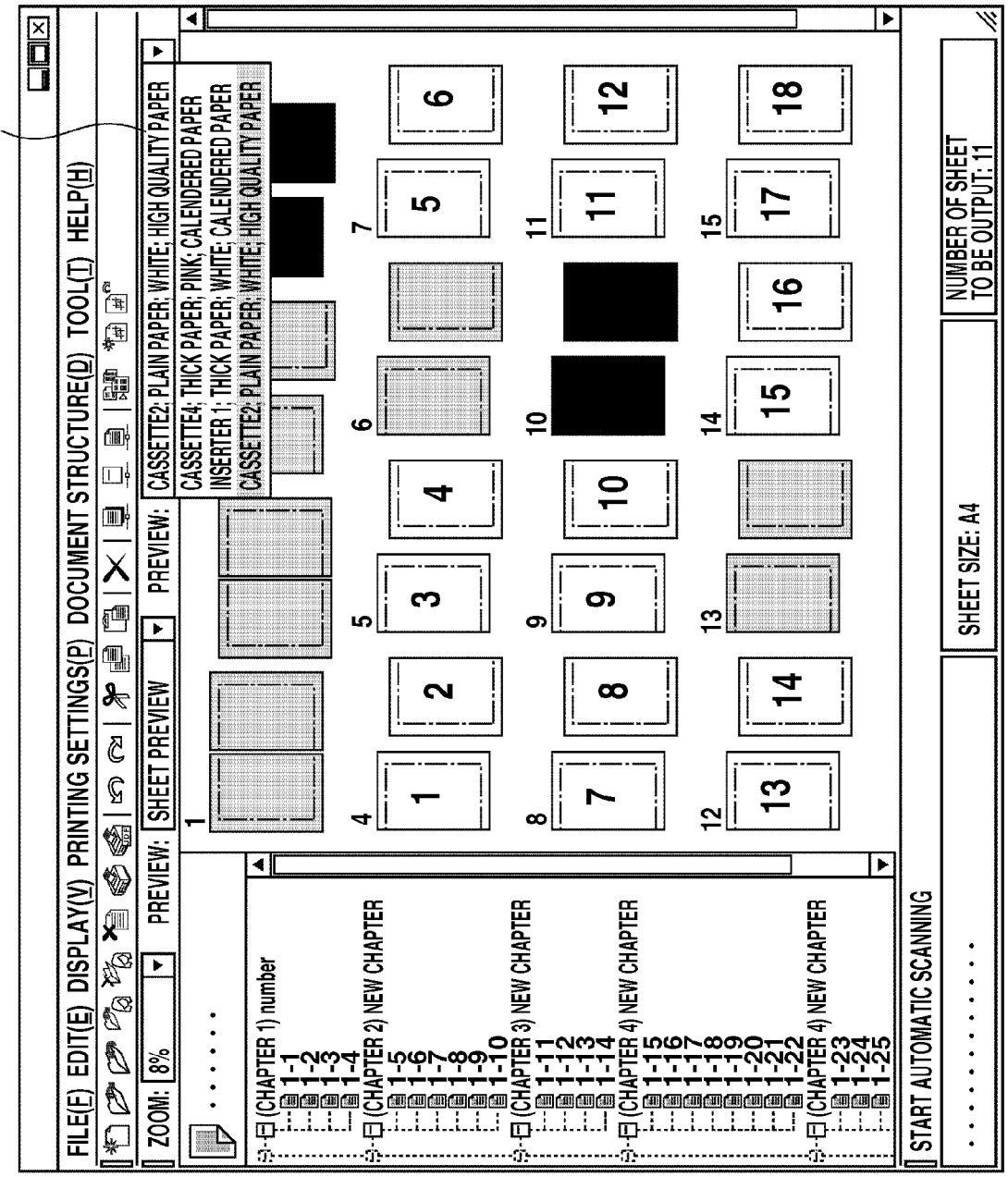

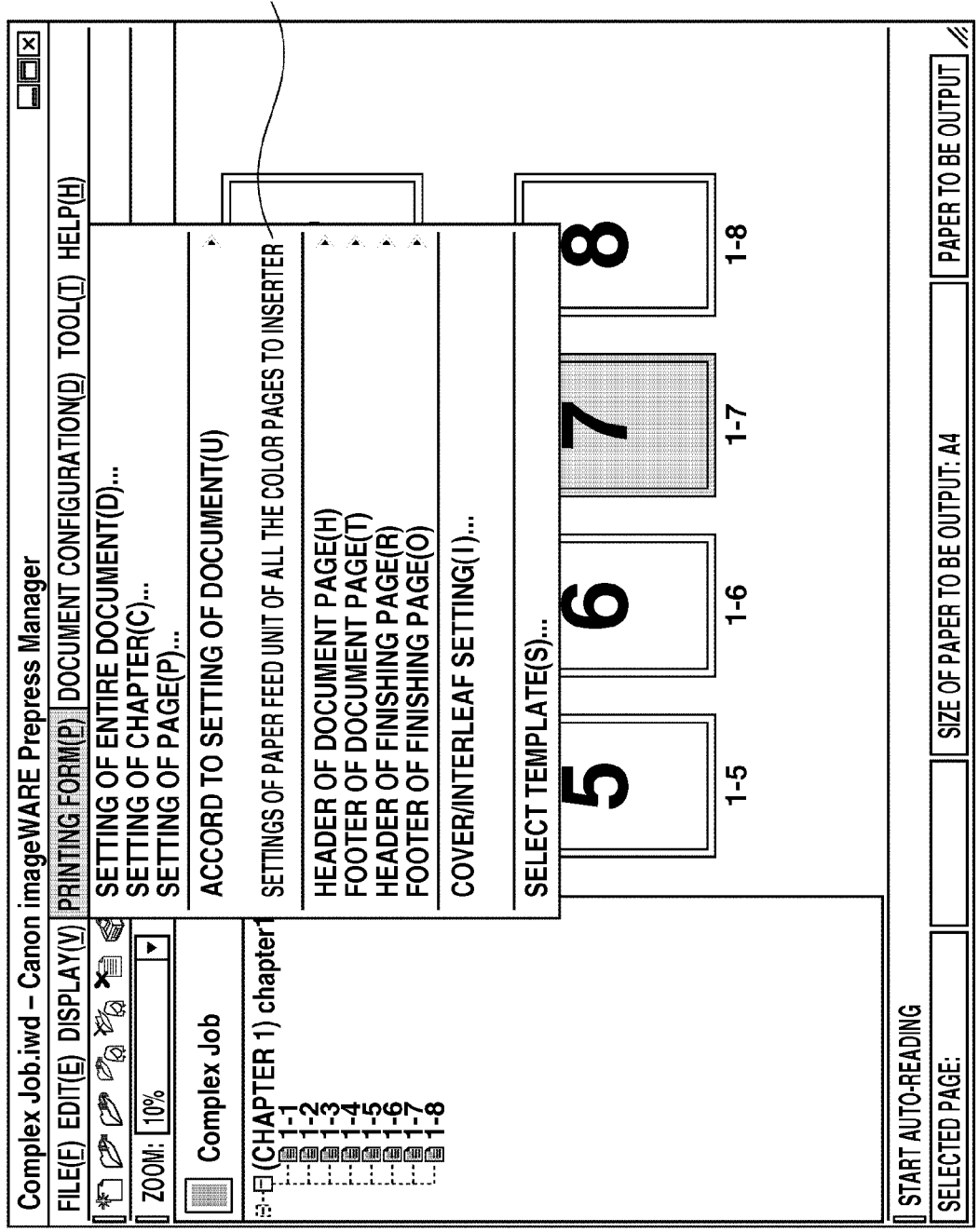

INFORMATION PROCESSING APPARATUS, INFORMATION PROCESSING METHOD, AND STORAGE MEDIUM FOR GENERATING PRINT DATA ACCORDING TO AN INSTRUCTION

BACKGROUND OF THE INVENTION

1. Field of the Invention

The present invention relates to an information processing apparatus, an information processing method thereof and a storage medium.

2. Description of the Related Art

With the development of speed-up and high-picture quality of an electro-photographic printing apparatus and an ink-jet printing device, a business category of print-on-demand (POD) has been appearing as a rival of the above described print industry. By dividing a job to be processed by the printing apparatus into relatively small lot jobs, the POD is directed to perform print processing within a short due date without using a large apparatus or a system.

In the POD, for example, an image forming apparatus such as a digital copying machine and a digital malfunction peripheral is used as much as possible in order to realize a digital printing by using an electronic data. In a printing job using the image forming apparatus, a post-processing step for executing stapling, punching, saddle stitch binding, case binding, uses an apparatus, such as a paper folding machine and a paper cutting machine, which is referred to as a finisher. These apparatuses can be divided into three types.

The first one is a finisher, which is connected to a paper feeding path of the image forming apparatus, and paper output from the image forming apparatus is conveyed through the paper feeding path. Such finisher is referred to as "in-line finisher". The second one is a finisher which is connected to a network but is not coupled with the image forming apparatus through the paper feeding path, so that no automatic conveyance is performed, i.e., a manual operation of an operator is required, for the printed paper. Such finisher is referred to as "near-line finisher".

The third one is a finisher which is not connected to a network nor has an information transmission unit. Such finisher is referred to as "off-line finisher". Some of the in-line finisher and the near-line finisher attached to the image forming apparatus (hereinafter referred to as the "printer") have an "inserter" function for inserting a sheet while printing or post-processing.

By using this "inserter" function, it becomes possible that only color pages such as a cover or an interleaf are preliminary printed by a full color printer, and subsequently the other pages are printed, when printing whole pages by a monochrome printer, while the printed color pages are inserted through the "inserter" attached to the printer. Accordingly, merging of the color pages and monochrome pages with a manual operation is no more required, and thus an effect that the cost can be suppressed more than the cost when the whole pages are printed at once by a color printer.

Japanese Patent No. 03848172 discloses such a technique that a pre-view image of paper inserted from the inserter can be displayed so as to be recognizable from a pre-view image of paper fed from a paper feed unit that is different from the inserter.

In Japanese Patent No. 03848172, the inserter could be designated as an attribute of the paper feed unit of the insertion paper such as the "cover" to be inserted into a top position of the document, and the "interleaf" and the "index paper" to be inserted into a top position of the chapter. However, for example, insertion of paper into a certain page included in the document from the inserter could not be designated. Further, such a printing method can also be employed that previously printing the "cover", the "interleaf", the "index paper", and the like of the pages included in the document are performed to generate the pre-print sheets, and the pre-print sheets are fed from the inserter, as required, when the body of the book is printed. However, use of the above described printing method invites the following inconvenience. That is, the document pages used in printing the "cover", the "interleaf", and the "index paper" included in the document are to be deleted from the document when the body of the book is printed and therefore, the document page cannot be stored within a single document. Further, in the conventional technique, a print content is not printed in the pre-view image of the paper fed from the inserter. Therefore, for example, in a case where a pre-print sheet is inserted, a user could not confirm the print content of the pre-print sheet in the preview image.

SUMMARY OF THE INVENTION

The present invention is directed to an information processing apparatus for reducing a load of a user when the user performs printing.

According to an aspect of the present invention, an information processing apparatus includes a selection unit configured to select a page to be printed from document data including a plurality of pages by a first print device, a designation unit configured to designate an attribute indicating that a printed matter of the selected page output by the first print device is fed from an inserter of a second print device with respect to the selected page, and a generation unit configured to generate print data so that a page of which attribute is not designated by the designation unit is printed in the second print device according to an instruction for printing document data including the plurality of pages and a printed matter of the page of which attribute is designated by the designation unit is fed from the inserter of the second print device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B, respectively, illustrate an example of a user interface screen when the book file is opened.

FIG. 8A illustrates an example of a user interface (UI) screen for print setting of the bookbinding application.

FIG. 8B illustrates an example of the UI screen in a case where a "cover" is selected as an insertion sheet in a "combination" combo box.

FIG. 8E illustrates an example of the UI screen in a case where insertion of the "cover", the "interleaf", and a "back cover" is selected in the "combination" combo box.

FIGS. 10A through 10E, respectively, illustrate an example of displaying a preview in a case where the interleaf fed from the inserter is inserted.

FIGS. 15A and 15B, respectively, illustrate an example of displaying a preview in a case where the cover and the interleaf fed from the inserter are inserted.

FIGS. 19A and 19B, respectively, illustrate an example of displaying a preview in a case where the cover and the interleaf fed from the inserter are inserted.

DESCRIPTION OF THE EMBODIMENTS

Various exemplary embodiments, features, and aspects of the invention will be described in detail below with reference to the drawings.

<System Summary>

Summary of a document processing system is described below with reference to FIGS. 1 through 8. In the document processing system, a data file created by a general application is converted into an electronic document file by using an electronic original writer. The book binding application provides a function for editing this electronic document file.

<System Configuration and Operation>

Figure 1:
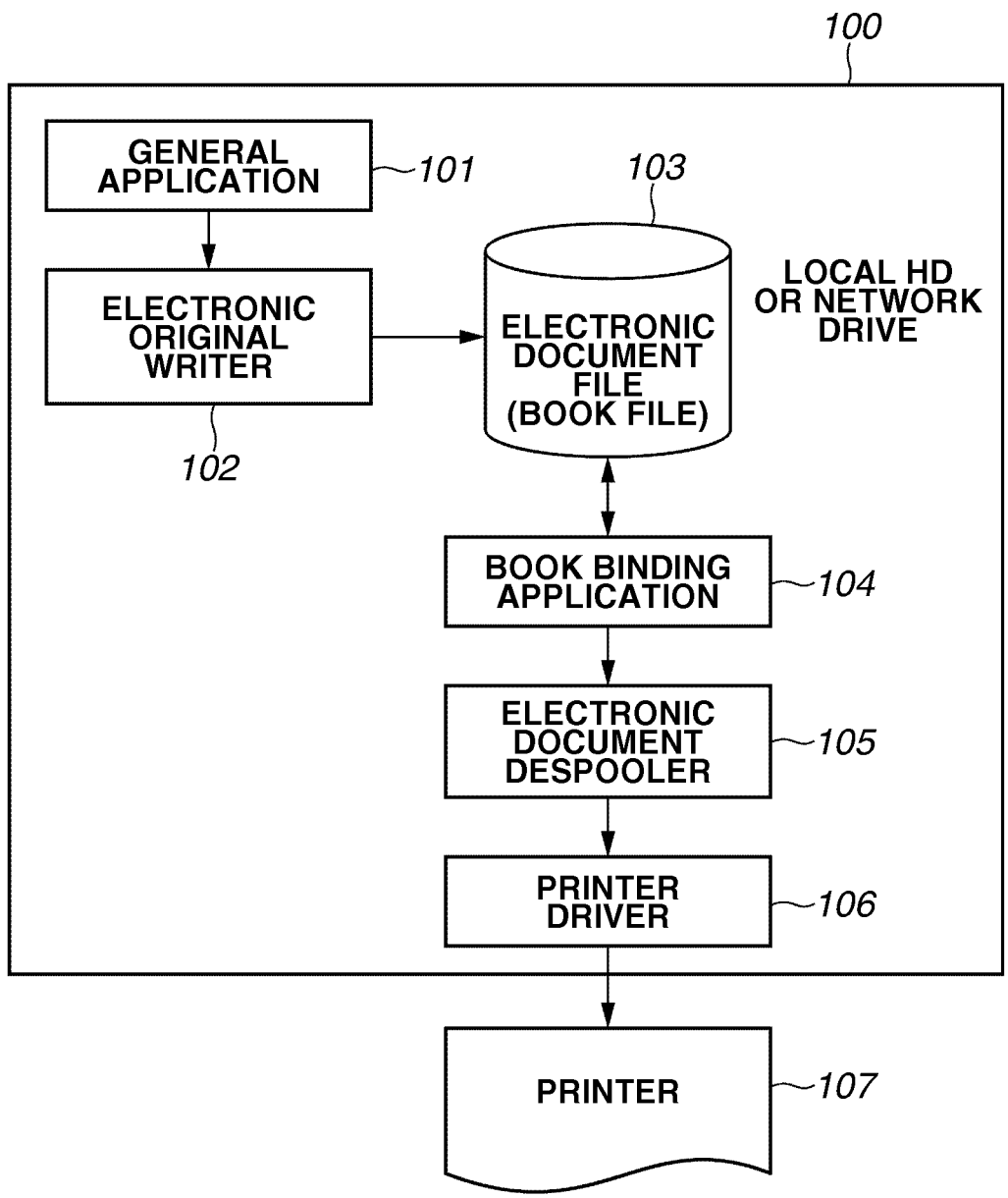
FIG. 1 illustrates an example of a software configuration of a document processing system.

FIG. 1 illustrates an example of a software configuration of a document processing system. The document processing system is realized by using an information processing apparatus (i.e., a personal computer) 100.

A general application 101 is an application program for providing functions of a word processing, a spreadsheet, photo retouching, drawing or a painting, presentation, and text editing. The general application 101 has a print function to an operation system (OS).

The general application 101, when application data is printed, uses a predetermined interface (e.g., a Graphic Device Interface (GDI)) provided by the OS. More specifically, the general application 101 transmits, in order to print the created data, a predetermined output command (e.g., a GDI function) having a format that depends on the OS to the output module of the OS which provides the predetermined interface.

An output module after receiving the output command converts the command into a format that the output apparatus such as a printer can process, and outputs thus converted command (e.g., a Display Driver Interface (DDI) function). The format that the output apparatus can process differs depending on a type, a maker, or a model of an apparatus. Therefore, the device driver is provided for each device. In the OS, the command is converted by using the device driver, thereby generating print data. Then, print job is generated by classifying the print data according to a Job Language (JL).

In a case where the Windows (registered trademark) is used as the OS, a module so called as a Graphic Device Interface (GDI) is exemplified as the above described output module.

An electronic original writer 102 is an improvement of the above described apparatus driver. The electronic original writer 102 is a software module to be provided for realizing the present document processing system. The electronic original writer 102, however, is not directed to a specific output device. The electronic original writer 102 generates an electronic document file by converting the output command into a format which can be processed by a below described book binding application 104 and printer driver 106.

A format after being converted by this electronic original writer 102 (hereinafter referred to as the "electronic document format") may be any format as far as the format can express a document per page unit in detail. Among substantive standard formats, for example, a Portable Document Format (PDF) and Standard Generalized Markup Language (SGML) format can be employed as the electronic document format.

In a case where the electronic original writer 102 is used from the general application 101, the electronic original writer 102 is to be designated as the device driver to be used for outputting, and then causes the electronic original writer 102 to print the document.

The electronic document file created by the electronic original writher 102 as it is does not have a final format as the electronic document file. Therefore, the book binding application 104 designates the electronic original writer 102 as a device driver. Under the control of the book binding application 104, the application data is converted into the electronic document file.

The book binding application 104 completes a new electronic document file generated by the electronic original writer 102 as the electronic document file having a below described format. Hereinafter, when this point is required to be clearly recognized, a file created by the electronic original writer 102 is referred to as the electronic document file, whereas the electronic document file of which structured is given by the bookbinding application 104 is referred to as the book file.

In a case where this point is not required to be discriminated, all of the document file, the electronic document file, and the book file generated by the electronic original writer 102 and the book binding application 104 respectively are referred to as a document file (or document data).

As described above, the electronic original writer 102 is designated as the device driver in order to cause the general application 101 to print the data. Accordingly, the application data is converted into the electronic document format by a page unit defined by the general application 101 (hereinafter referred to as the "logical page" or the "document page"), and then is stored in a storage medium such as a hard disk in the form of an electronic document file 103.

The hard disk may be a local drive built in a computer which realizes the document processing system of the present exemplary embodiment. Alternatively, the hard disk may be a drive provided on the network when the hard disk is connected to the network.

The book binding application 104 reads the electronic document file or a book file 103, and provides a function for editing the electronic document file or the book file 103 to a user. Here, the bookbinding application 104 does not provide a function for editing a content of each of the pages but provides a function for editing configurations of the below described chapters and books, which includes pages as a minimum unit.

When the book file 103 edited by the book binding application 104 is printed, the book binding application 104 activates an electronic document despooler 105. The electronic document despooler 105 generates an output command that matches the output module of the above described OS and outputs to an output module (not illustrated) in order to read a designated book file from the hard disk and print each of the pages in the form of a format described in the book file.

At that time, a printer driver 106 of a printer 107 to be used as an output device is designated as the device driver. The output module converts the output command received by using the designated printer driver 106 of the printer 107 into a device command capable of being interpreted and executable by the printer 107. Then, the device command is transmitted to the printer 107, and an image corresponding to the command is printed by the printer 107.

Figure 2:
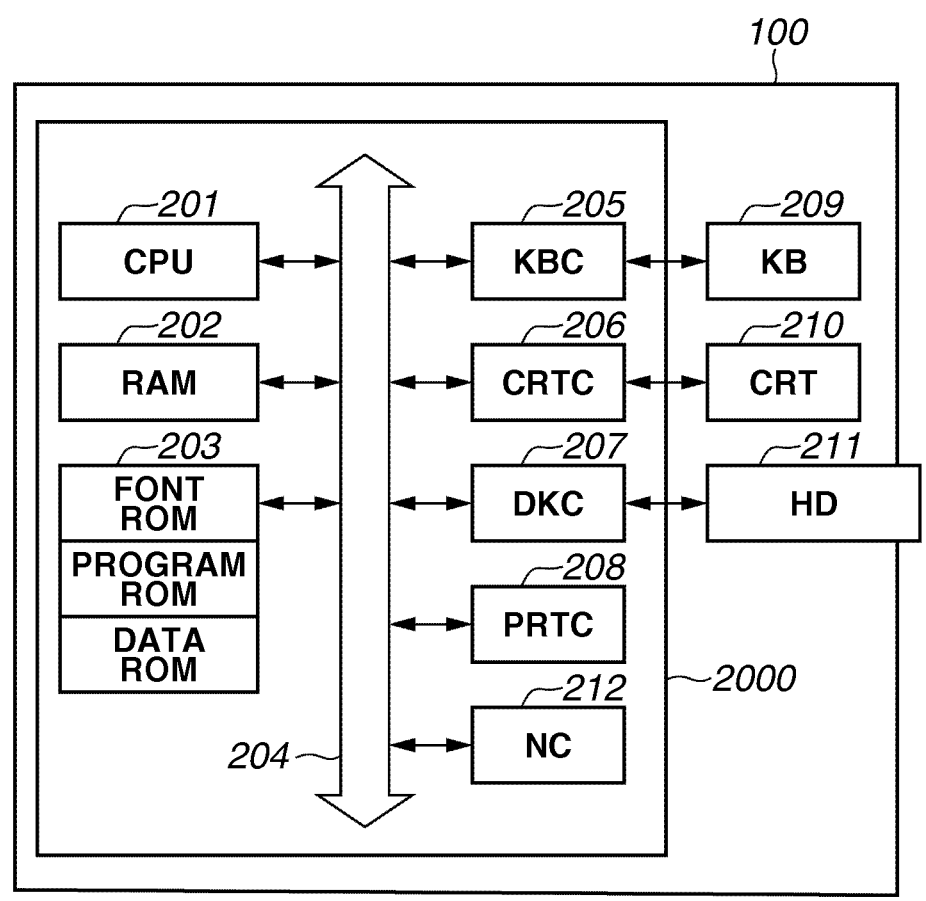
FIG. 2 illustrates an example of a hardware configuration of an information processing apparatus.

FIG. 2 illustrates an example of a hardware configuration of the information processing apparatus. A central processing unit (CPU) 201 executes a program of an OS or a general application loaded from a program Read Only Memory (ROM) of a ROM 203, or a hard disk 211 to a Random Access Memory (RAM) 202, or a program of the book binding application 104, and realizes the software configuration of FIG. 1 and processing of below described flow charts.

The RAM 202 serves as a main memory or a work area of the CPU 201. A keyboard controller (KBC) 205 controls a key input operation through a keyboard 209 or a pointing device (not illustrated). A CRT controller (CRTC) 206 controls a display of the CRT display 210. A disk controller (DKC) 207 controls an access with a hard disk (HD) 211 for storing a boot program, various applications, font data, user files, and editing files, and a flexible disk (FD) (not illustrated).

A printer controller (PRTC) 208 controls an exchange of signals between the PRTC 208 and the printer 107 connected to the PRTC 208. A network controller (NC) 212 is connected to the network and executes communication control processing between the NC 212 and the other apparatuses connected to the network.

<Format of an Electronic Document Data>

Before describing details of the book binding application 104, a data format of the book file is described below. The book file has three layered structure simulating a book as a paper medium. An upper layer is referred to as a "book" which simulates a single book and includes a definition of an attribute relating to the entire book.

A middle layer lower than the upper layer corresponds to chapters of the book and is also referred to as a "chapter". An attribute can be defined for each of the chapters.

A lower layer is referred to "pages". The lower layer corresponds to each of the pages defined by the application program. An attribute can be defined for each of the pages. A single book may include a plurality of chapters and a single chapter may include a plurality of pages.

Figure 3A:
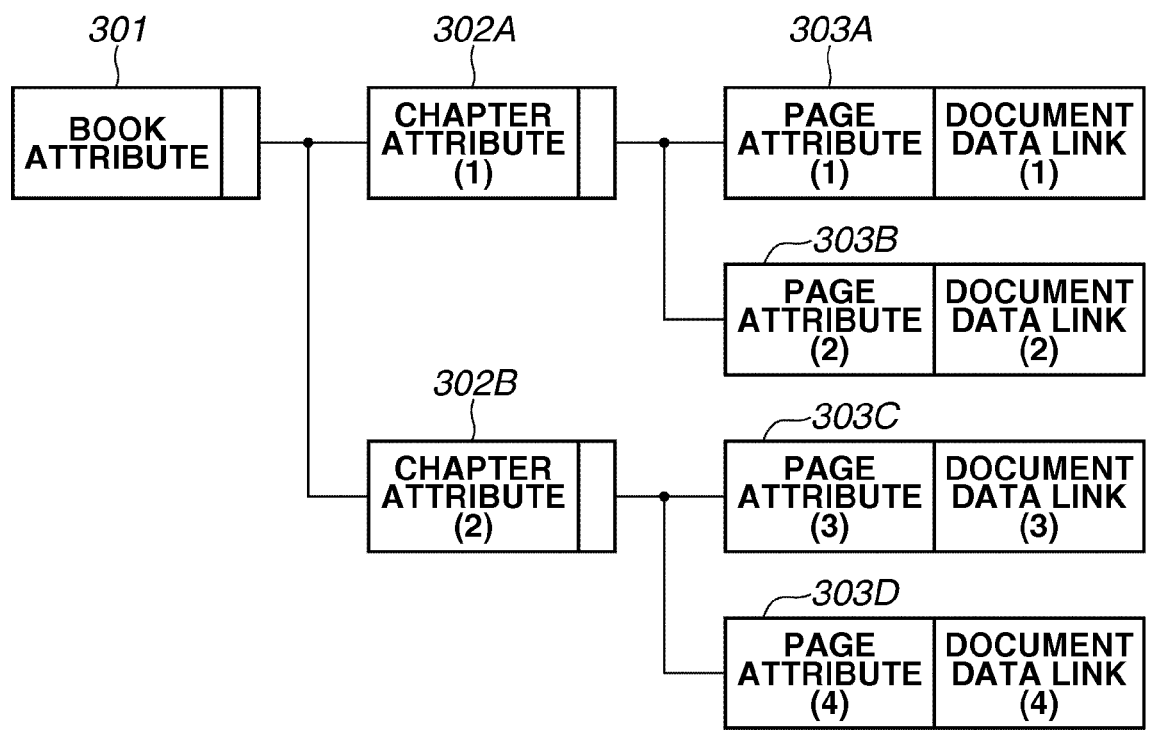
FIGS. 3A and 3B, respectively, illustrate an example of a configuration of a book file.

FIG. 3A schematically illustrates an example of a book file format. A book, chapters, and pages in the book file of this example are illustrated by nodes corresponding to the respective book, chapters, and pages. A single book file includes a single book. The book and the chapters are concepts for defining a configuration of the book, so that the book and the chapters include defined attribute values and links to the lower layer as a substance thereof.

Each of the pages has data output by the application program as the substance of the each page. Therefore, the pages, respectively, include a substance of the document page (i.e., document page data (document data)) and a link to each of the document page data in addition to an attribute value of the page.

A print page when it is output to a paper medium or the like sometimes includes a plurality of document pages. A configuration of this print page is not displayed by the links but is displayed as the attribute in each of the layers of the book, the chapter, and the page.

In FIG. 3A, a book attribute 301 includes a definition of a book attribute as well as two chapter attributes 302A and 302B are linked to the book attribute 301. According to this linking state, inclusion of the chapter attributes 302A and 302B in the book attribute 301 is displayed.

The chapter attribute 302A displays that page attributes 303A and 303B are linked to the chapter attribute 302A and therefore, are included in the chapter attribute 302A. An attribute value is defined to each of the page attributes 303A and 303B. The page attributes 303A and 303B, respectively, includes the link to the corresponding document page data (1) and (2) as the substance of the page attribute.

Figure 3B:

These links indicate data (1) and (2) of the document page data (i.e., document data) 304 illustrated in FIG. 3B, and displays that the substances of the page attributes 303A and 303B are document page data (1) and (2), respectively.

Now, details of the book attribute will be described. Regarding items which can be defined redundantly with the lower layer, an attribute value of the lower layer is priory employed. Therefore, regarding the items included only in the book attribute, a value defined in the book attribute becomes a value effective throughout the entire book.

The items redundantly defined with the lower layer has meaning as a predetermined value in a case where the redundant items are not defined in the lower layer. Each item illustrated in FIG. 3 does not correspond to specific one item but sometimes includes a relevant plurality of items.

Items unique to the book attribute include 6 items such as a print method, a binding detail, a cover/back cover, an index paper, an interleaf, and a chapter separation. These items are defined via the book. A print method attribute can be designated from three values such as a one-sided printing, a two-sided printing, and a bind printing.

The bind printing is a print method that prints sheets so that independently designated several sheets are bound and folded, and thereafter thus bound sheets are filed to form a book. In a binding detail attribute, a facing direction and the number of sheets to be bound are designated when the bind printing is designated.

A cover/back cover attribute includes a designation of attachment of sheets to be used as the cover and the back cover, and a designation of a print content to the attached sheets when the electronic document files to be formed into a book are printed. An index paper attribute includes a designation of insertion of a tabbed index paper to be independently prepared for the printing apparatus and a designation of a print content to be printed on the index (i.e., ear) portion for the indication of separations of the chapters.

This attribute becomes effective in a case where an inserter having an insertion function for inserting at a desired position a sheet prepared apart from the print sheets, is built in the printing apparatus or a case where a plurality of sheet cassettes can be used. The same can be applied to the interleaf attribute.

An interleaf attribute includes a designation of insertion of the sheet, as a break of the chapter, fed from the inserter or the sheet cassette, and a designation of a paper feeding source in a case of inserting the interleaf.

A chapter break attribute includes, at every breaks of the chapter, a designation to use a new sheet, a designation to use a new print page, or a designation to do nothing. In a case of one-sided printing, the use of the new sheet has the same meaning as the use of the new print page. In a case of two-sided printing, if the "use of the new sheet" is designated, the chapters are not printed continuously in a single sheet. However, if the "use of the new print page" is designated, chapters may be continuously printed on a front surface and a rear surface of a single sheet.

Then, a chapter attribute and a page attribute are described below. A relationship between the chapter attribute and the page attribute is similar to a relationship between the book attribute and the attribute of the lower layer.

Regarding the chapter attribute, the chapter includes no unique item but includes the items duplicating the book attribute. Therefore, if a definition in the chapter attribute differs from a definition in the book attribute, a value defined in the chapter attribute has a priority.

Items common only to the book attribute and the chapter attribute include 5 items, i.e., a sheet size, a sheet direction, an N-up print designation, a scaling, and a method for discharging papers. Among these, the N-up print designation attribute is an item for designating the number of document pages included in a single print page. Examples of an arrangement that can be designated include 1×1, 1×2, 2×2, 3×3, and 4×4.

A paper discharge method attribute is an item for designating whether or not stapling processing is provided to the discharged sheet or designating whether or not Z-folding processing is provided to the discharged sheet. Whether or not this attribute is available depends on whether or not the printing apparatus to be used has a stapling function and a Z-folding function.

Examples of the items unique to the page attribute include a page rotation attribute, zooming, an arrangement designation, an annotation, and a page division. The page rotation attribute is an item for designating a rotational angle when a document page is arranged on a print page. The zooming attribute is an item for designating a magnification ratio of the document page.

The magnification ratio is designated providing that a size of a virtual logical page area is 100%. The virtual logical page area is an area occupied by a single document page in a case where the document page is arranged according to a designation of the N-up or the like. For example, in a case of 1×1, the virtual logical page area becomes an area corresponding to a single print page and, in a case of 1×2, the virtual logical page area becomes an area that each of the sides of the single print page is reduced to about 70%.

A water mark attribute, paper feed unit attribute, and a header/footer attribute are common to the book, the chapter, and the page. A paper feed unit attribute is an item for designating a paper feeding deck that stacks papers to be output for the sake of printing the book, the chapters, and the pages. The water mark is an image or a character string, each of which is printed over data created by an application and separately designated. The header/footer is a water mark to be printed on an upper margin or a lower margin of each page. Items which can be designated according to variables such as a page number and a date are prepared for the header/footer.

Contents that can be designated in the water mark attribute and the header/footer attribute are common to the chapter and the page but not to the book. In the book, the contents of the water mark and the header/footer can be set and also how to print the water mark and the header/footer throughout the book can be designated.

On the other hand, in the chapter and the page, whether or not the water mark or the header/footer set by the book can be printed can be designated.

<Generation Procedure of Book File>

Figure 4:
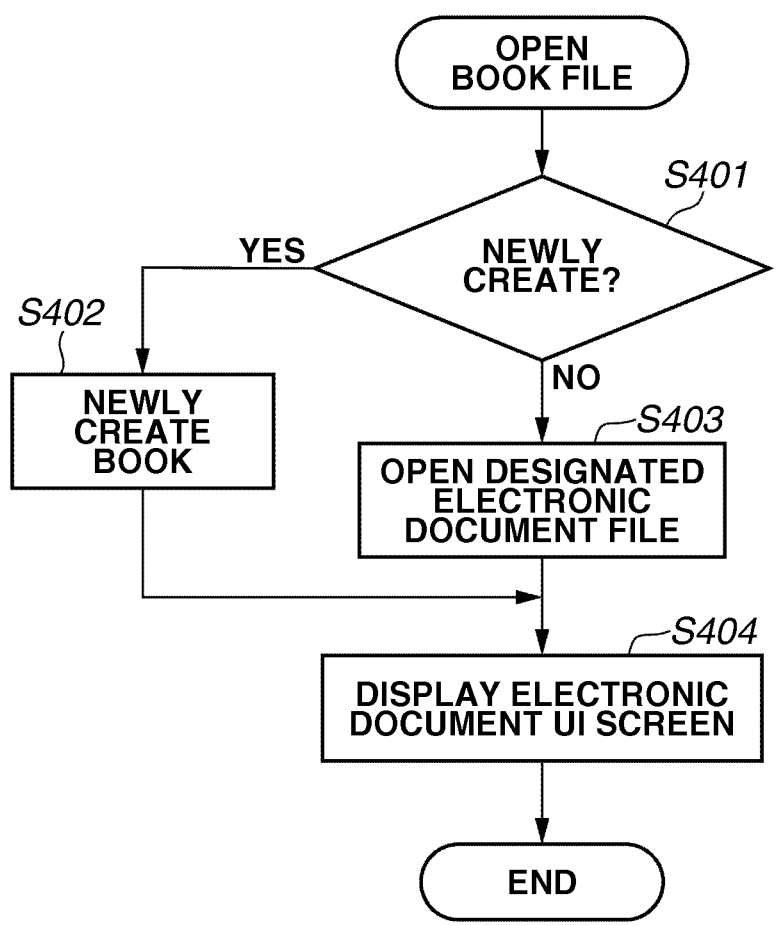
FIG. 4 is a flow chart illustrating an example of a procedure when the book file is opened by using a book binding application.

A book file has the above described configuration and content. Now, a procedure (processing) for creating a book file by the book binding application 104 and the electronic original writer 102 is described below. Creation of the book file is realized in the way of editing operation of the book file performed by the book binding application 104. FIG. 4 is a flow chart illustrating an example of a procedure when the book binding application 104 opens the book file.

In step S401, the book biding application 104 determines whether the book file, which the book binding application 104 is about to open, is a new book file to be created or an existing book file. If the book file is newly created (YES in step S401), in step S402, the book binding application 104 newly creates a book file which does not include a chapter.

The book file to be newly created includes only a node of the book attribute 301 in a case of the example illustrated in FIG. 3, and thus is a node of a book in which no link exists with respect to the node of the chapter. A set of attribute preliminary prepared as a newly created attribute is applied to the book attribute.

In step S404, the book binding application 104 displays a user interface (UI) screen for editing a new book file. FIG. 5B illustrates an example of the UI screen when the new book file is created. In this case, since the book file does not have a substantial content, nothing is displayed on an UI screen 700.

Figure 5A:
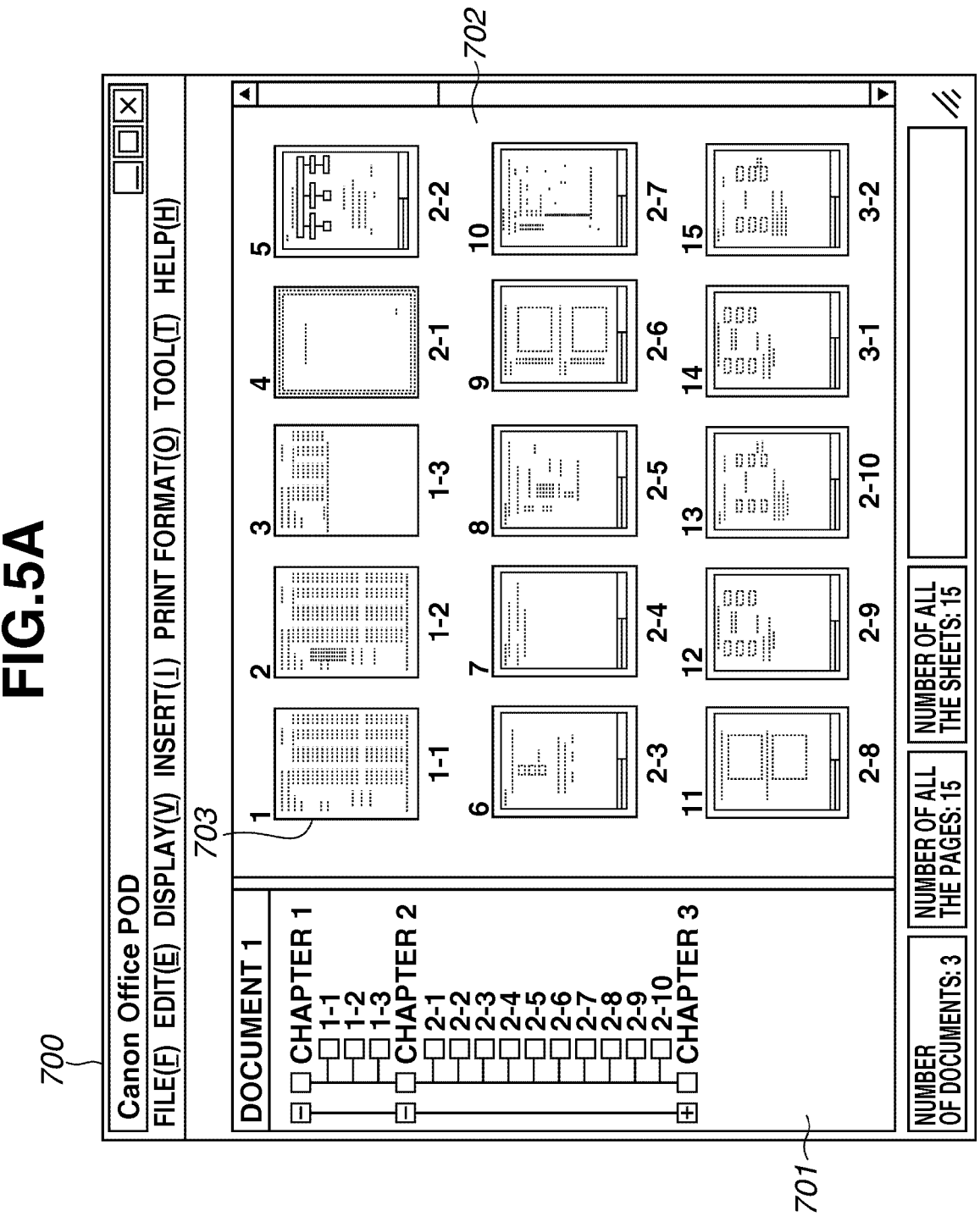

In step S403, on the other hand, if there is an existing book file, the book binding application 104 opens the designated book file. Then, the bookbinding application 104 displays the user interface (UI) screen according to a structure, attributes, and contents of the book file. FIG. 5A illustrates an example of this UI screen.

The UI screen 700 includes a tree area 701 illustrating a structure of the book and a preview area 702 displaying a printed state. In the tree area 701, the chapters included in the book and the pages included in each of the chapters are displayed in the form of the tree structure as illustrated in FIG. 5A. The pages displayed in the tree area 701 are the document pages (i.e., the document page data). In the preview area 702, the contents of the print pages are reduced to be displayed. A structure of the book is reflected to a displaying order of the print page.

Application data converted into an electronic document file by the electronic original writer 102 can be added to the opened book file as the new chapter. This function is referred to as an electronic document import function. An electronic document import is performed with respect to the book file newly created according to the procedure of FIG. 4, thereby providing a substance to the book file. This function is activated by a drug and drop operation of the application data onto a screen of FIG. 5A or 5B.

Figure 6:
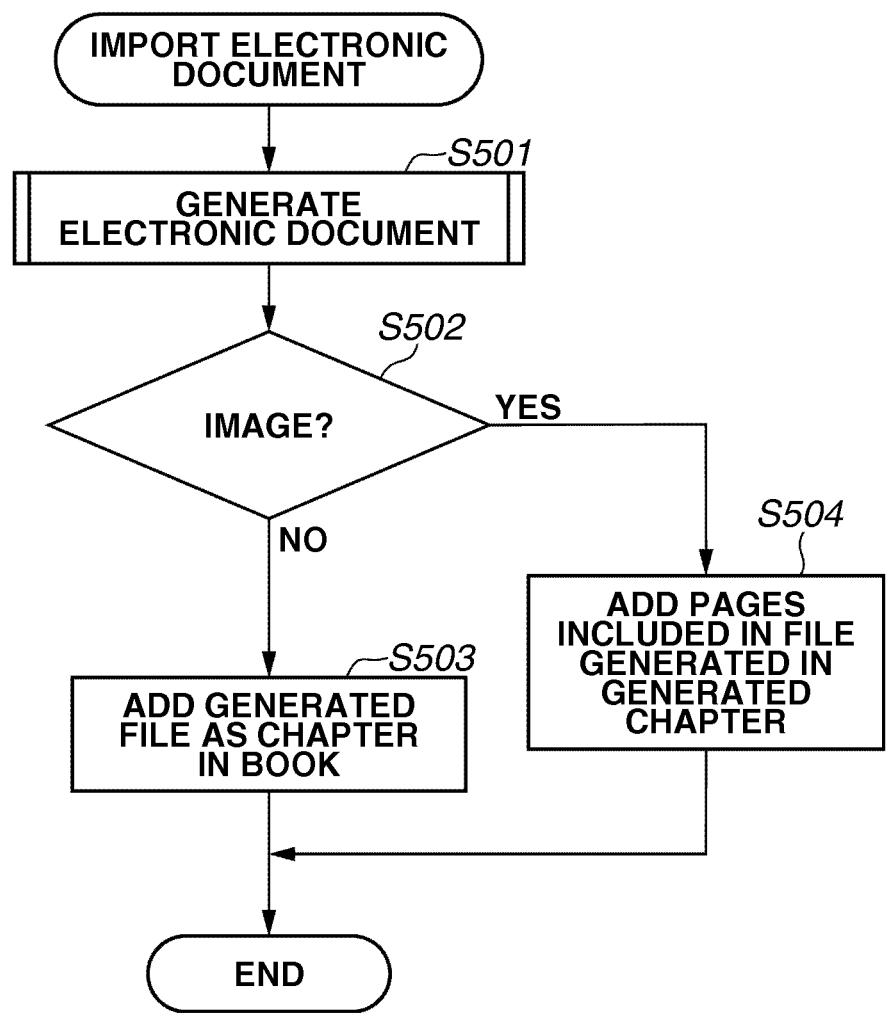
FIG. 6 is a flow chart illustrating an example of a procedure of an electronic document import.

FIG. 6 is a flow chart illustrating an example of a procedure of the electronic document import. The book binding application 104 activates an application program by which designated application data is generated.

In step S501, the book binding application 104 designates the electronic original writer 102 as the device driver, and prints out the application data, thereby converting the application data into electronic document data. Details of processing of step S501 is described below with reference to FIG. 7.

In step S502, after the application data is converted into the electronic document data, the book binding application 104 determines whether or not the converted data is the image data. This determination can be performed based on a file extension of the application data in a case under the windows OS.

The book binding application 104 is windows bit map data in a case where the extension is a "bmp". The book binding application 104 is a jpeg compressed image data in a case where the extension is a "jpg". Alternatively, the book binding application 104 is image data having a tiff format in a case where the extension is a "tiff".

In a case of the above described image data, different from step S501, the book binding application 104 can generate the electronic document file directly from the image data without activating the application. Therefore, the step S501 can be omitted in this case.

When the extension is not the image data (NO in step S502), in step S503, the book binding application 104 adds the electronic document file generated in step S501 to the book of the presently opened book file as a new chapter. A value of the book attribute is copied as the chapter attribute when the chapter attribute is common to the book attribute. A predetermined value preliminary prepared is set as the chapter attribute when the chapter attribute is not common to the book attribute.

In a case where the extension is the image data (YES in step S502), in step S504, the book binding application 104 adds each document page included in the electronic document file generated in step S501 to the designated chapter, in principle, without adding a new chapter. In a case where the book file is a newly created file, the book binding application 104 creates a new chapter and adds each page of the electronic document file as the page belonging to the chapter.

In a case where the page attribute is common to the attribute of the upper layer, an attribute value of the upper layer is given to the page attribute. In a case where the attribute defined by the application data is succeeded to the electronic document file, the value of the electronic document file is given to the page attribute. For example, in a case where the N-up designation is set in the application data, an attribute value thereof is succeeded. As described above, a new book file is created or a new chapter is added.

Figure 7:
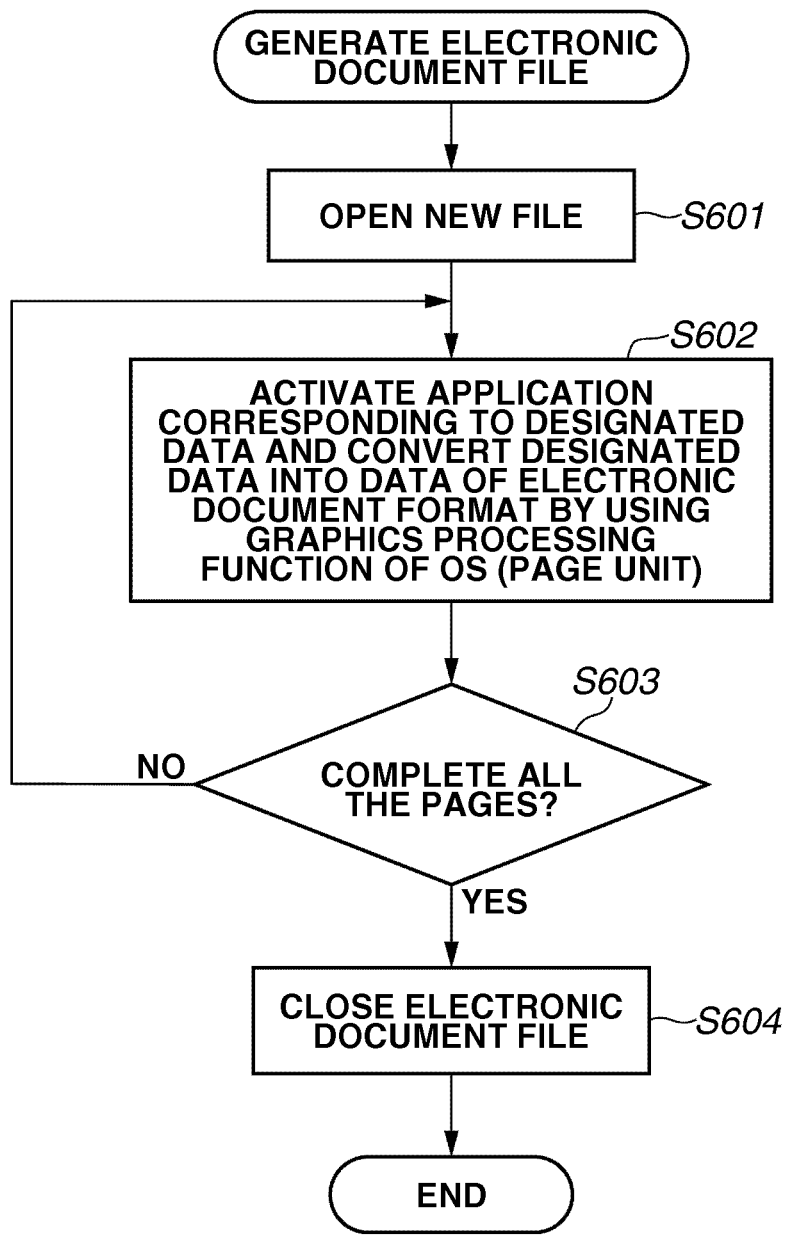
FIG. 7 is a flow chart illustrating an example of a procedure that the electronic document file is generated by an electronic original writer in step S501 of FIG. 6.

FIG. 7 is a flow chart illustrating an example of a procedure for causing the electronic original writer 102 to generate the electronic document file in step S501 of FIG. 6.

In step S601, the book binding application 104 creates a new electronic document file and opens the new electronic document file. The book binding application 104 activates an application corresponding to the designated application data, and causes the electronic original writer 102 as the device driver to transmit an output command to the output module of the OS.

In step S602, the output module converts the received output command into data having the electronic document format by the electronic original writer 102, and outputs the data. The data is output to the electronic document file opened in step S601.

In step S603, the electronic original writer 102 determines whether the conversion is completed with respect to all the designated data. In step S604, when the conversion is completed (YES in step S603), the electronic original writer 102 closes the electronic document file. The electronic document file generated by the electronic original writer 102 is a file including a substance of the document page data illustrated in FIG. 3B.

<Editing of Book File>

As described above, the book file can be created from the application data. The following editing operation can be provided to the chapters and the pages of thus generated book file.

(1) newly adding
(2) deleting
(3) copying
(4) cutting
(5) attaching
(6) moving
(7) changing a chapter name
(8) re-allocating a page number name
(9) inserting a cover
(10) inserting an interleaf
(11) inserting an index paper
(12) providing a page layout with respect to each of the document pages In addition to the above, a cancelling operation to cancel an editing operation once performed, and a returning operation to return the cancelled operation can be provided to the chapters and the pages of thus generated book file.

With the above described editing function, editing operations, for example, integration of a plurality of book files, re-arrangement of the chapters and/or the pages in the book file, deletion of the chapters and/or pages in the book file, change of layouts of the document pages, insertion of the interleaves and/or index papers, and the like can be performed. When these operations are performed, an operation result is reflected to the attributes of the book, the chapter, and the page, or to the structure of the book file.

For example, if the user performs an adding operation for adding a new blank page, a blank page is inserted into a designated portion. This blank page is processed as the document page. Further, if the user changes the layout with respect to the document page, a changed content is reflected to the attributes of the print method, the N-up printing, the cover/back cover, the index papers, the interleaves, and the chapter breaks.

Figure 8C:
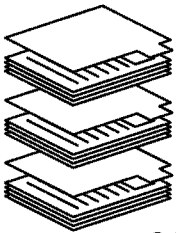
FIG. 8C illustrates an example of the UI screen in a case where insertion of an "index paper" is selected in the "combination" combo box.
Figure 8D:
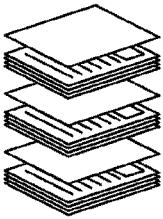
FIG. 8D illustrates an example of the UI screen in a case where insertion of an "interleaf" is selected in the "combination" combo box.

<Output of Book File>
  <Output of Book File>
  As described above, the created/edited book file is finally directed to be printed out. When the user selects the file menu from the UI screen 700 of the book binding application 104 illustrated in FIGS. 5A and 5B, and further selects the printing, the book file is printed out by the designated output device.
  At the time, the bookbinding application 104 creates a job ticket from the presently opened book file, and passes the job ticket to the electronic document despooler 105. The electronic document despooler 105 converts the job ticket into an output command of the OS, e.g., a GDI command of the windows, and transmits the output command to the output module, e.g., the GDI. The output module generates a command suitable for the device by the designated printer driver 106 and transmits the command to the device.
  The job ticket is data having a structure that a document page is the minimum unit. The structure in the job ticket defines the layout of the document page on the sheet. One job ticket is issued for one job.
  Therefore, the uppermost layer includes a node of document where the attribute of the entire document, e.g., a two-sided printing/one-sided printing, is defined. Below the uppermost layer, a sheet node belongs. The sheet node includes attributes of an identifier of the sheet to be used and a designation of a paper feeding port of the printer.
  Each sheet node includes a node of the sheet to be printed by using the paper. One sheet corresponds to one piece of paper. Each sheet includes a print page (i.e., a physical page). In a case of the one-sided printing, the one sheet includes the one physical page. In a case of two-sided printing, the one sheet includes two physical pages. Each physical page includes a document page arranged on the physical page. An attribute of the physical page includes the layout of the document page.
  The electronic document despooler 105 converts the above described job ticket into the output command to be transmitted to the output module.
  <Content of Preview Display>
  As described above, when the book file is opened by the book binding application 104, the UI screen 700 illustrated in each of FIGS. 5A and 5B is displayed. In the tree area 701, a tree indicating a structure of the opened book (hereinafter referred to as the "target book") is displayed. In the preview area, three different display methods are prepared according to the designation of the user.
  A first method is a mode that is so called as a document preview in which the document page is displayed as it is. In the document preview mode, a content of the document page belonging to the target book is reduced in its size, and displayed. The layout is not reflected to the display of the preview area.
  A second method is a mode that is so called as a print preview. In the print preview mode, the document page is displayed so that the layout of the document page is reflected to the document page.
  A third method is a mode that is so called as a simple print preview. In the simple print preview mode, a content of each document page is not reflected to the display of the preview area but only the layout of the document page is reflected.
  <Insertion of "Cover, Back Cover", "Interleaf", and "Index Paper">
  Now, paper feed setting processing in the printing processing according to the present exemplary embodiment is described below. FIG. 8A through 8E, respectively, illustrate an example of the UI screen for setting insertion or non-insertion of the "cover and back cover", the "interleaves", and the "index papers". The setting of insertion or non-insertion is provided by the book binding application 104.
  The book binding application 104 outputs GUI information of the UI screen to the output module of the OS, and controls the display screen so as to display the GUI information through the display driver (not illustrated).
  FIG. 8A illustrates an example of the UI screen for setting print setting of the bookbinding application 104. An example of FIG. 8A illustrates a case where setting is made in such a manner that only a normal page is inserted but no specific page is inserted, and thus there is no item to be specifically set. The user operates a "combination" combo box 801, and can select a pattern from patterns for setting a combination of the insertion sheets.
  FIG. 8B illustrates an example of the UI screen in a case where the "cover is selected as the insertion sheet in the "combination" combo box 801. In the UI screen of FIG. 8B, the user can select, as the paper feeding source of the insertion sheet, whether the insertion sheet is designated by the paper feed unit such as the inserter or the cassette decks or the insertion sheet is designated according to the sheet types.
  In a case where the user selects the paper feed unit, the user can select the paper feeding source for inserting the "cover" from the inserter or the cassette decks in the UI screen of FIG. 8B. In a case where the user selects the inserter, a preliminary prepared sheet is taken into from the inserter as the cover (In this case, no printing is performed when the cover is taken into.).
  In a case where the cassette decks or the sheet types is designated as the paper feeding source and a check box 802 for "printing the document also onto the cover" is ON, a top page of the print document can be printed as the cover.
  Hereinafter, the check box 802 for "printing the document also onto the cover" is simply referred to as the check box 802. In a case where the inserter is designated as the paper feeding source, even if the check box 802 is ON, the book binding application 104 does not print a print content of the page corresponding to the cover but instructs the printer to take out the cover sheet from the inserter. Then, the cover sheet is inserted into the printer.
  FIG. 8C illustrates an example of the UI screen in a case where the user selects the insertion of an "index paper" in the "combination" combo box 801. The user uses the UI screen of FIG. 8C in order to set a model number of the index to be used and an attribute of characters to be printed to the index unit.
  FIG. 8D illustrates an example of the UI screen in a case where the user selects the insertion of the "interleaf" in the "combination" combo box 801. In a case where the user selects the insertion of the "interleaf", the "interleaf" is inserted into a top of a chapter by a chapter unit. A check box 804 for "printing the document also onto the interleaf" is simply referred to as the check box 804.
  FIG. 8E illustrates an example of the UI screen in a case where the insertion of the "cover", the "interleaf", and the "back cover" is selected in the "combination" combo box 801. The user uses the UI screen in order to insert the cover to the top of the document at the same time while the index papers and the interleaves are inserted into the top of all the chapters, respectively.
  As described above, in a case where special papers such as the "cover", the "index paper", the "interleaf, and the "back cover" are inserted in a print job, an operation efficiency can be enhanced and the setting error can be eliminated since the setting can be made from a single UI screen with ease.
  The setting made according to the above described method can be managed together with document data in the form of the attribute information for printing a target document. In this case, the attribute information is read out together with the document data when reading out the document data, and the attribute information is output to the printer driver together with the document data. Accordingly, the attribute information and the document data are printed out by using a past setting as it is.

In a case where the check box 802 is checked, a print content of a top page of the document data is printed onto the cover.

On the other hand, in a case where the check box 804 is checked, the book binding application 104 analyzes a structure of the document data to specify the top page of each of the chapters. Then, the print content of the top page is printed onto the interleaf. Therefore, a page, which is a second page of each chapter before the insertion of the interleaf is selected, moves up to the top page of each chapter after the insertion of the interleaf is selected.

Figure 9:
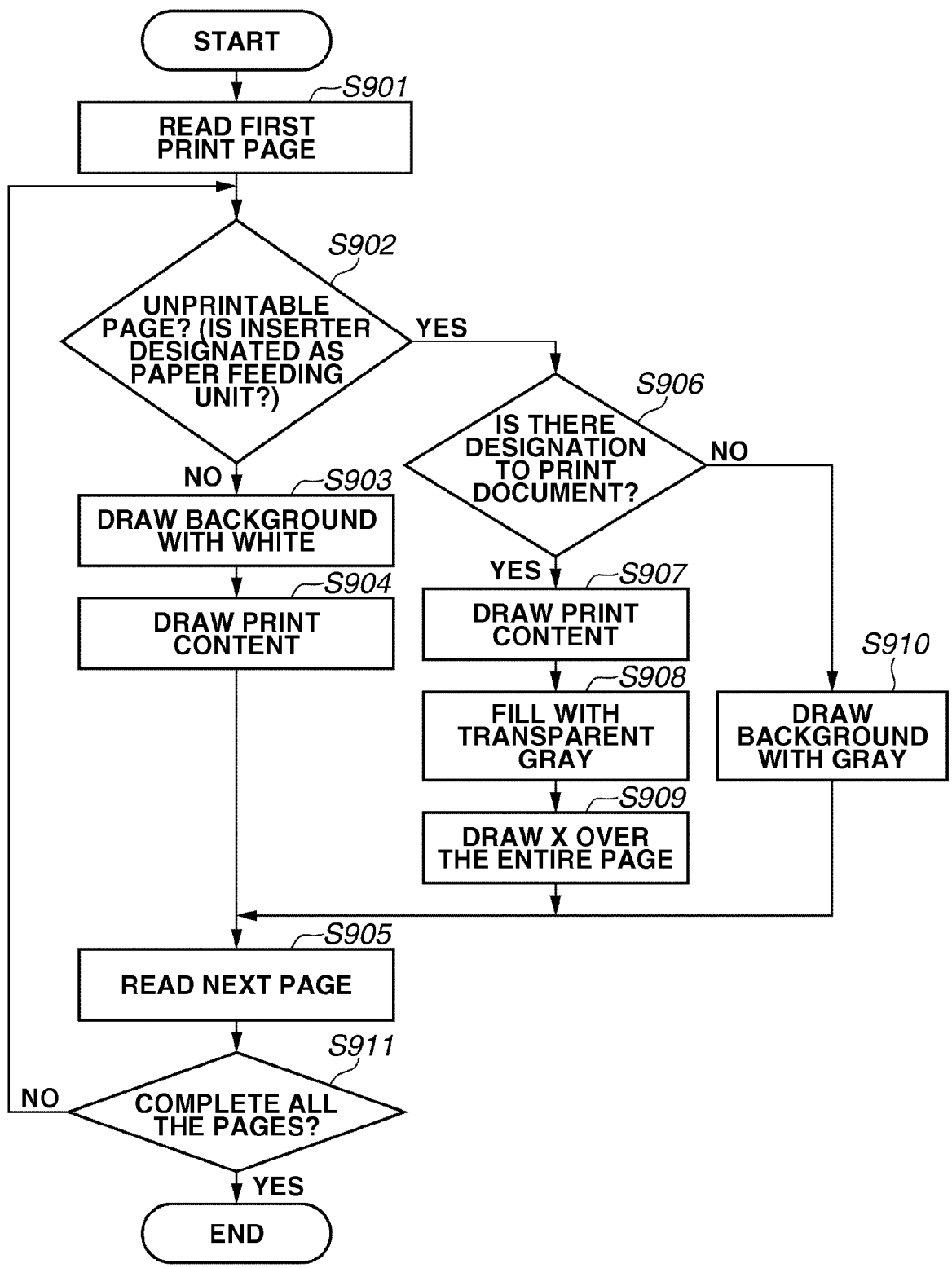
FIG. 9 is a flow chart illustrating processing for displaying a printable page distinctly from an unprintable page.
Figure 10A:
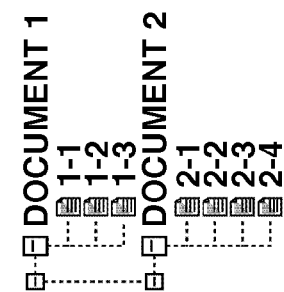
Figure 10A:
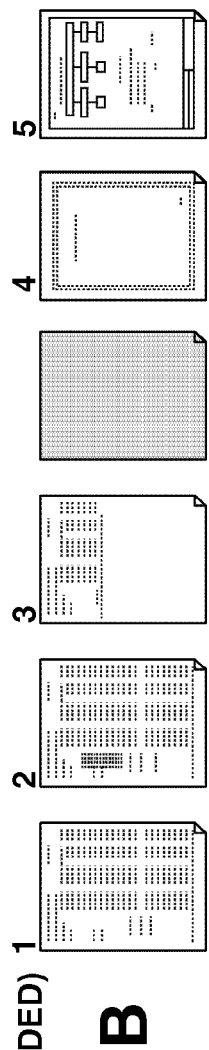
Figure 10A:
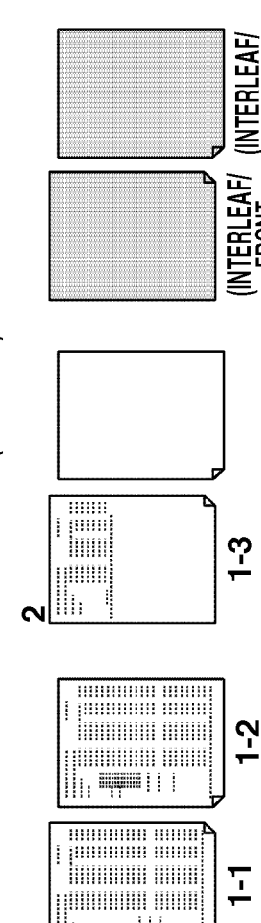
Figure 10A:
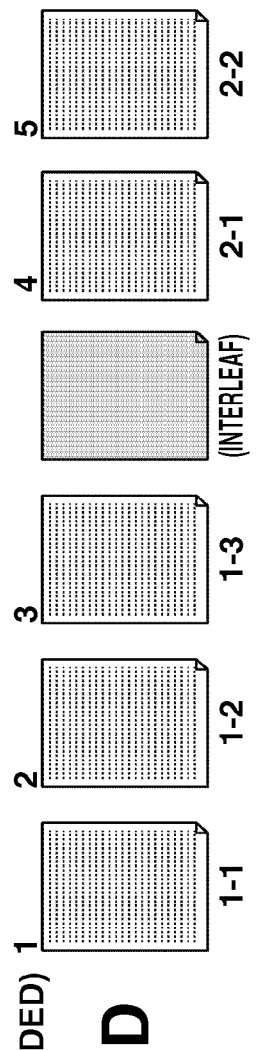
Figure 10A:
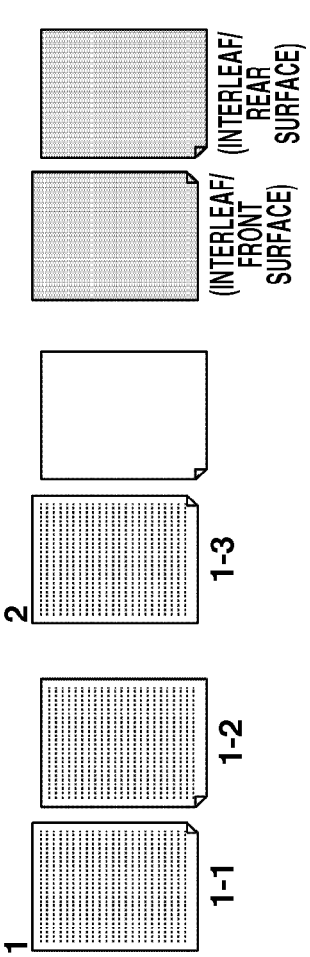

Now, a print preview according to the present exemplary embodiment is described below in detail. FIG. 9 is a flow chart included in a series of processing for printing a print content of a page onto a paper different from the insertion paper. FIG. 9 is a flow chart illustrating processing for displaying the printable page distinctly from the unprintable page.

In step S901, in order to display a printable state or an unprintable state, the book binding application 104 reads the document data and the attribute information in this order from the first page.

In step S902, in a case where a print instruction for printing the print content of the page onto a paper different from the insertion paper is issued, the book binding application 104 determines whether this page is printable or this page is not printable based on the attribute information of the read page. More specifically, the book binding application 104 determines that the page to which the inserter is designated is the unprintable page, whereas the book binding application 104 determines that the page to which the paper feed unit different from the inserter is designated is the printable page.

In a case of the printable page (i.e., in a case where a paper to be used in printing the target page is fed from other than the inserter) (NO in step S902), in step S903, the book binding application 104 sets the background color of the page to awhile color. In step S904, the print content of the target page is drawn onto the page.

In a case of the unprintable page (i.e., When the paper to be used in printing the target page is fed from the inserter) (YES in step S902), in step S906, the book binding application 104 determines whether or not printing of the document is designated. In other words, the book binding application 104 determines whether the check box 802 of the "cover/interleaf setting" window of FIG. 8 is ON or the check box 804 of "printing the document also onto the interleaf" of FIG. 8 is ON.

When printing is to be performed is designated (YES in step S906), in step S907, the book binding application 104 draws the print content onto the page. In step S908, a transparent gray color is filled onto the page. In step S909, the book binding application 104 draws×mark over the entire page.

When the unprinting of the document is designated (NO in step S906), in step S910, the book binding application 104 fills the entire page with the gray color.

When the book binding application 104 repeats this processing sequentially to each of the pages (steps S905 and S911), finally, all the printable pages come to have a white background, whereas all the unprintable pages come to have a gray background. Therefore, a printable/unprintable state of each of the pages can be discriminated at a glance.

The colors of white and gray are only examples. As far as the user can discriminate the printable/unprintable state of each page, the book binding application 104 may display the pages with the colors other than the white and gray in a manner the user can discriminate the printable/unprintable state. The book binding application 104 may display the printable/unprintable state not with colors but with designs for each page.

Processing from steps S908 through S910 of FIG. 9 enables a display of a preview image of FIG. 10. The processing of step S909 of FIG. 9 enables a display of a preview image of FIG. 11A.

Figure 11A:
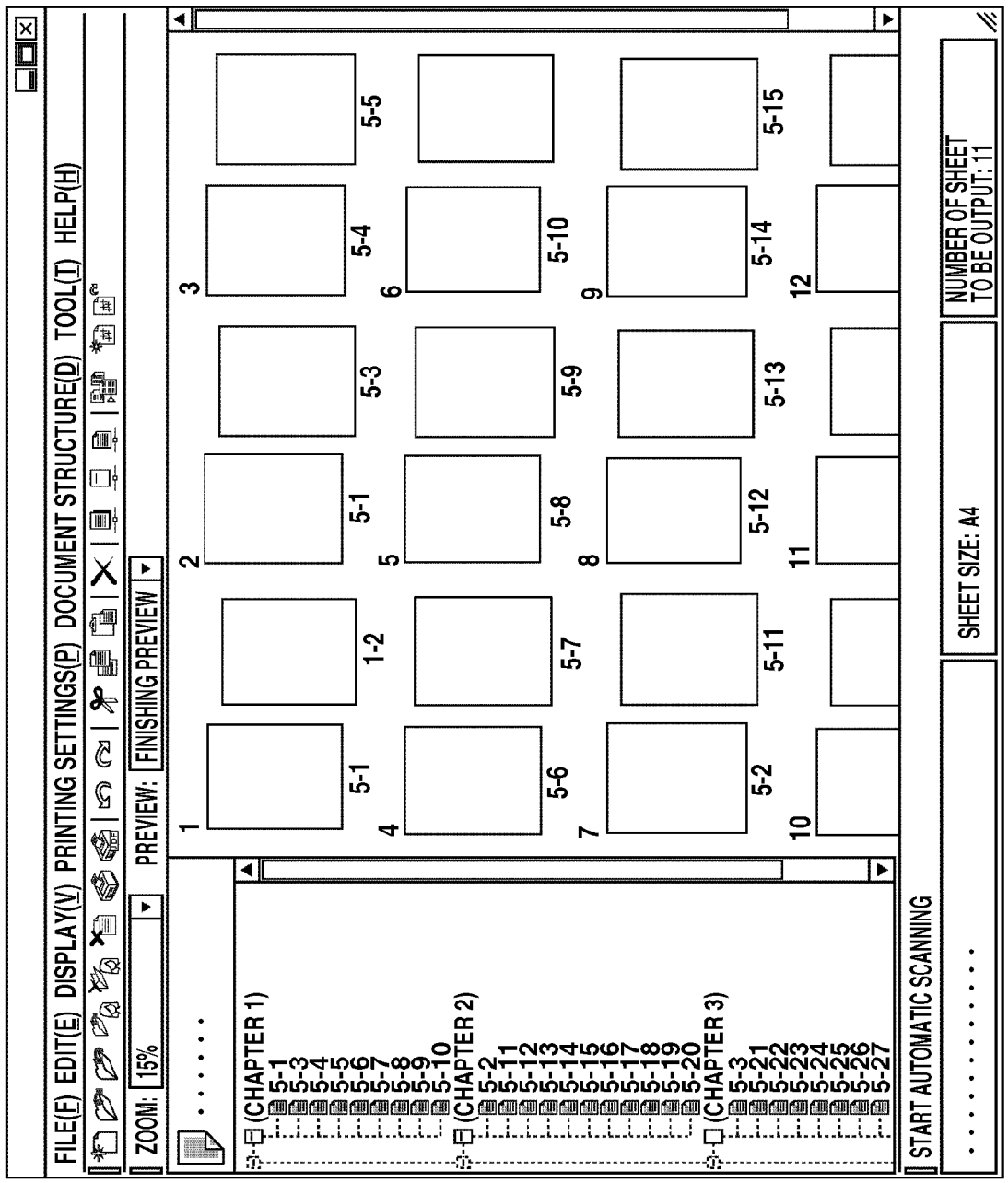
FIGS. 11A and 11B, respectively, illustrate an example of displaying a preview in a case where the cover and the interleaf fed from the inserter are inserted.

FIG. 11A illustrates a case where insertion of the cover/interleaf from the inserter is set and the check boxes are ON as to "print document on also the cover" and "print document on also the interleaf" in the two-sided print setting and in a window of "cover/interleaf setting".

In this case, a print content of each of the pages is displayed as to a page to be printed and a cover/interleaf to be fed from the inserter in a case where a print instruction for printing a print content of a page onto a paper different from the insertion paper is issued. However, in order to clearly display that the cover/interleaf fed from the inserter is not printed, the entire page is filled with the transparent gray color and provided with x mark over the entire page as a mark indicating that no printing is to be performed as to the page.

As a result thereof, in a case where a print instruction for printing a print content of a page onto a paper different from the insertion paper is issued, the user can also see the print content of the page that is not targeted to be printed. Further, since the backgrounds of the pages are discriminated by colors, the user can recognize which sheet is not to be printed (i.e., the sheet to be inserted) at a glance.

Figure 11B:
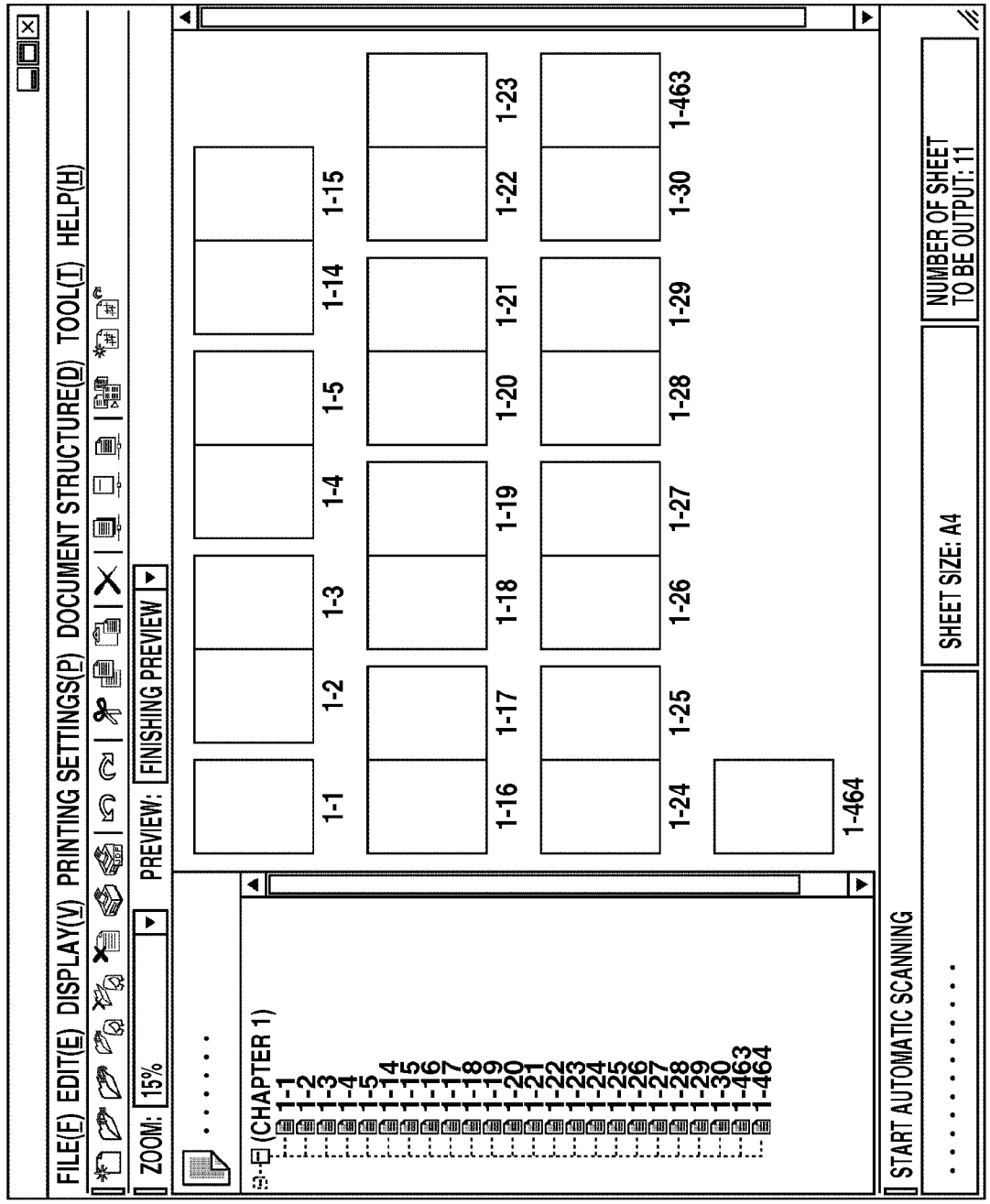

FIG. 11B illustrates an example of a case of case binding print in which the setting is made so as to insert the cover from the inserter. In FIG. 11B, similar to FIG. 11A, the cover to be inserted is displayed in a readily understandable manner.

<Insertion of Paper Sheets from Inserter to Free Positions>

Figure 20:
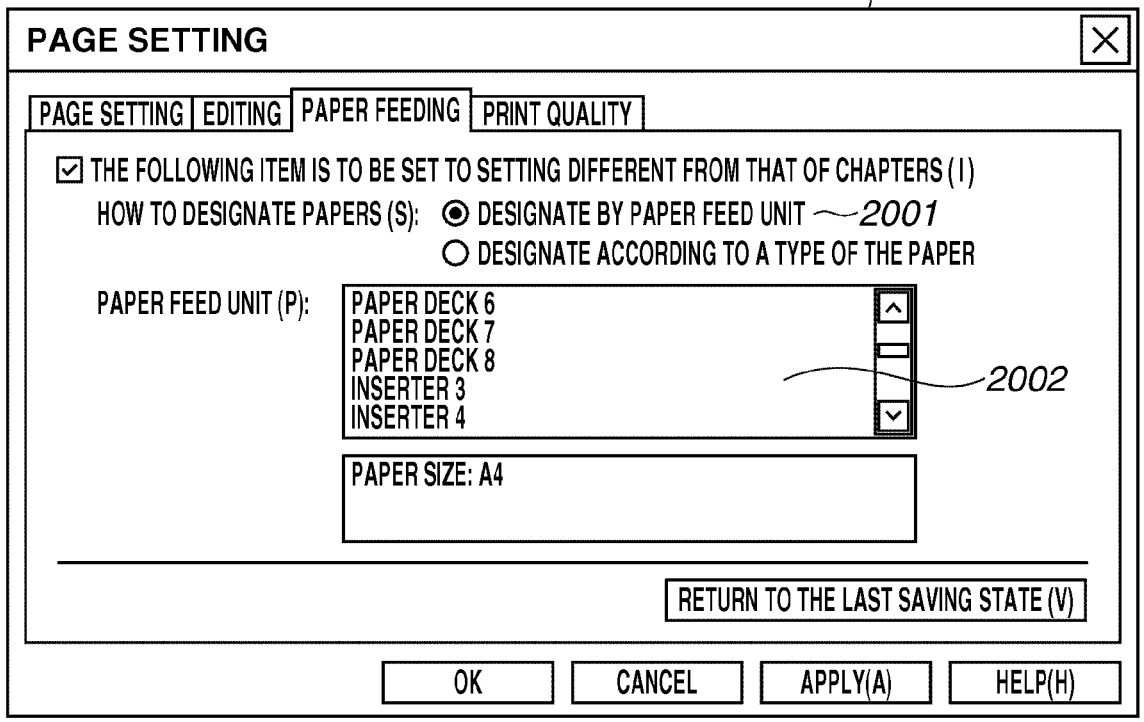
FIG. 20 illustrates an example of a user interface (UI) screen for print setting of the bookbinding application.

In the book binding application 104, setting of the paper feed unit per page unit can be made in the page setting screen 2000 illustrated in FIG. 20. In this page setting screen 2000, the user can designate the paper feeding from the inserter. The user can select a certain page from the plurality of pages included in the document data in the tree area 701 or the preview area 702, and can right-click to open the page setting screen 2000. The page setting screen 2000 includes a paper designation method 2001 and a paper feed unit 2002. In the paper designation method 2001, the "paper feed unit" or the "type of the paper" is designated as the paper designation method for printing the certain page selected by the user. In a case where the "paper feed unit" is designated, a list of the paper feeding decks that are available by the selected devices is displayed in the paper feed unit 2002, and the user designates the paper deck in which papers the user wishes to use in printing the certain page are stacked or a desired paper feeding deck in the inserter.

If the user sets the inserter as the "paper feed unit" of the certain page of the document data in the paper feed unit 2002, the user also can perform "job split printing", i.e., can print the pre-print sheets having been printed by using the other printer while inserting the pre-print sheets from the inserter.

When the user designates the paper feeding deck in the paper feed unit 2002, the book binding application 104 stores information of the selected paper feeding deck as the paper feed unit attribute contained in the page attribute of the page and holds the information within the book file in the form of a job ticket.

<Job Split Printing Processing>

Figure 21:
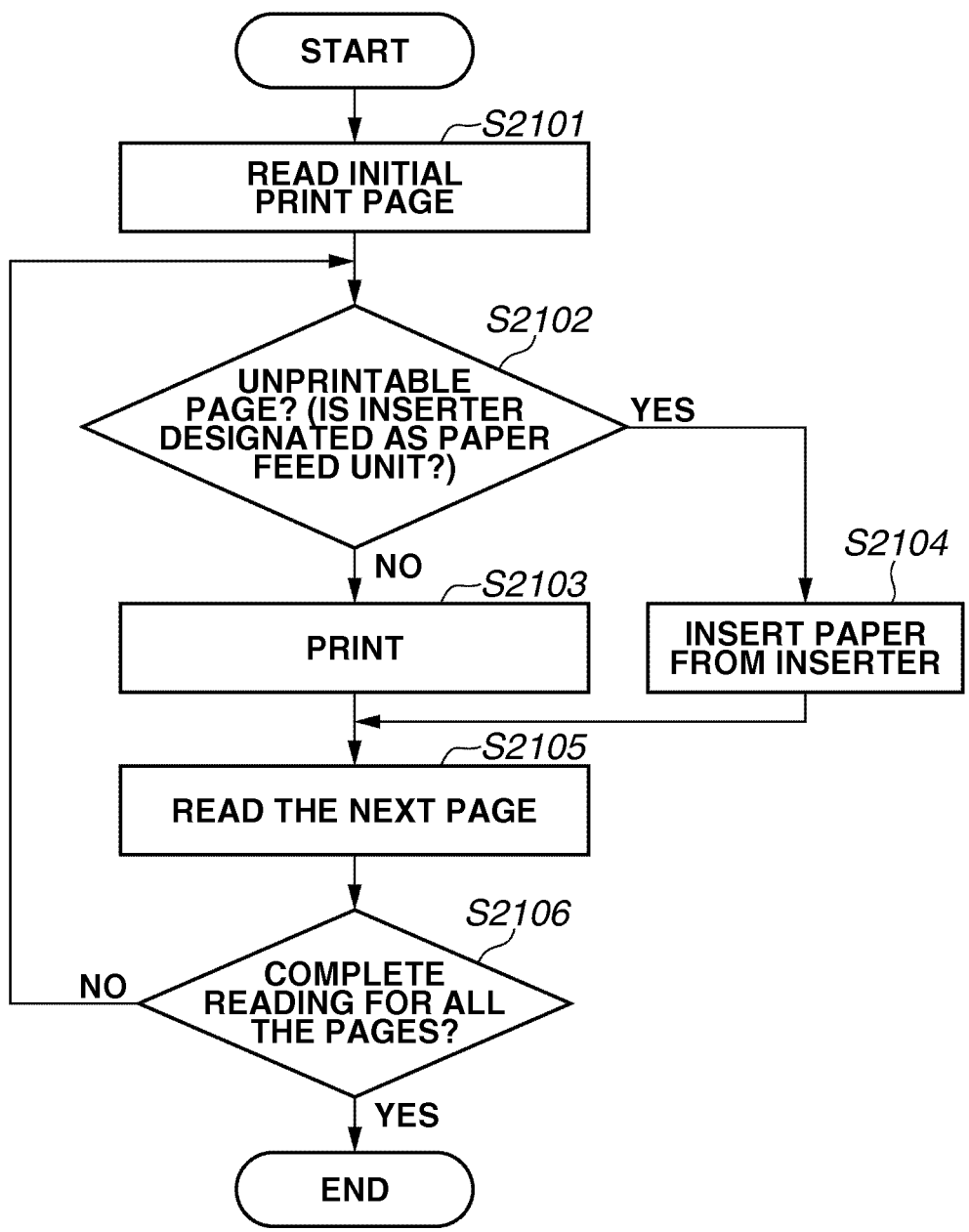
FIG. 21 is a flow chart illustrating an example of print processing while paper sheets are inserted in some parts from an inserter in the book binding application.

FIG. 21 is a flow chart illustrating processing of the "job split printing" performed in the information processing apparatus of the present invention. An example of the job split printing is described here. For example, when the user selects color pages contained in the document data and instructs printing of the color pages, the book binding application 104 generates print data of the color pages in order to print the selected color pages by a full-color printer (i.e., a first print device). Subsequently, in a case where the user prints the same document data with a monochrome printer (i.e., a second print device), the book binding application 104 generates print data for printing the monochrome pages while the color pages having been printed by the full-color printer are inserted at appropriate positions from the inserter of the monochrome printer. In other words, in a case where the document data is printed by using the monochrome printer in the above described example, pages that are not used in generating the print data of the full-color printer becomes print objects. Accordingly, an order of pages of the original document data is replicated in an order of the printed matters output by the monochrome printer.

In the above described example, the color pages and the monochrome pages are exemplified. However, in addition thereto, such a method is also considered that the job split printing is performed by using thick paper pages and plain paper pages. The job split printing of the present exemplary embodiment is described by exemplifying the job split printing of the color pages and the monochrome pages. When the user instructs printing of the pages, in step S2101, the book binding application 104 reads page data sequentially from the first page. In step S2102, the book binding application 104 determines whether or not the inserter is designated as the paper feed unit attribute for the page to be processed based on the attribute information of the read page. In a case where the book binding application 104 determines that the attribute of paper feed unit of the page to be processed is not the inserter (NO in step S2102), in step S2103, the book binding application 104 issues an instruction to print the page to be processed.

On the other hand, in a case where the book binding application 104 determines that the inserter is designated as the paper feed unit attribute of the page to be processed (YES in step S2102), the book binding application 104 does not issue the instruction to print the page to be processed. In step S2104, the book binding application 104 issues an instruction to insert a paper sheet (i.e., a pre-print sheet) from an inserter deck designated with respect to a position of the page.

As described above, the book binding application 104 discriminates the pages to which the inserter is designated as the paper feed unit from the pages to which a device other than the inserter (e.g., a paper deck or the like) is designated based on the document data. Then, the book binding application 104 prints the pages to which paper feeding from the device other than the inserter is designated and, with respect to the page to which the paper feeding from the inserter is designated, the book binding application 104 instructs so that the paper is to be inserted from the inserter deck as required.

In steps S2105 and S2106, when this processing is executed for each of the pages, the "job split printing" can be performed. In other words, printing can be performed while color pages having been printed are inserted from the inserter built in the printer.

Figure 22:
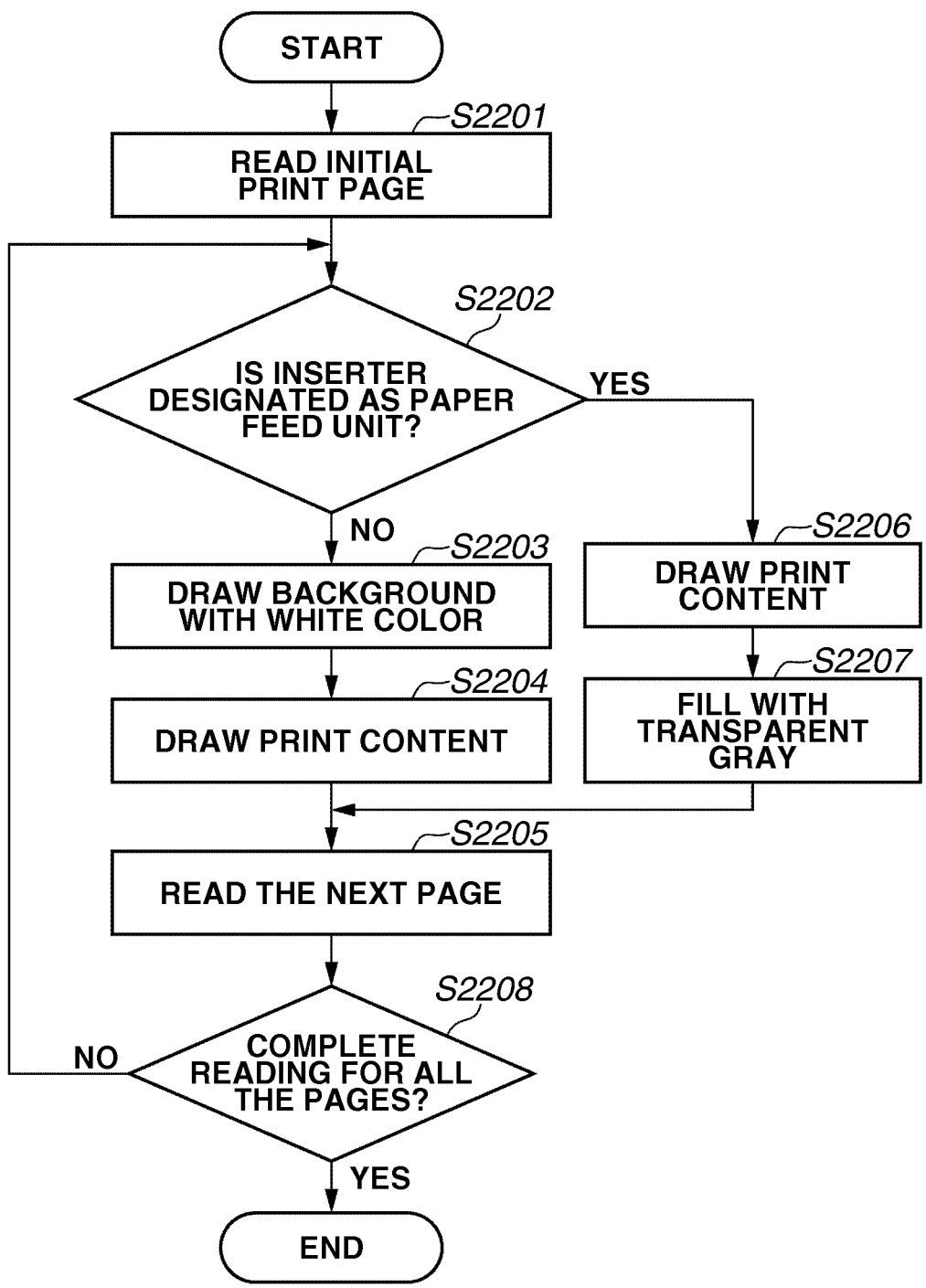
FIG. 22 is a flow chart illustrating an example of processing for distinctly displaying paper sheets to which the inserter is designated as the paper feed unit.

Now, print preview according to the present exemplary embodiment is described below in detail. FIG. 22 is a flow chart illustrating processing for distinctly displaying pages to which the inserter is designated as the paper feed unit attribute.

In step S2201, the book binding application 104 reads document data and attribute information sequentially from the first page. In step S2202, the book binding application 104 determines whether or not the inserter is designated as the paper feed unit attribute of the page to be processed. Then, in a case where the device other than the inserter is designated as the paper feed unit of the page (NO in step S2202), in step S2203, the book binding application 104 sets a white color as a background color of the page. In step S2204, the book binding application 104 subsequently draws a print content of the target page on the white background of the page.

On the other hand, in a case where the inserter is designated as the paper feed unit of the page (YES in step S2202), in step S2206, the book binding application 104 draws the print content onto the page. In step S2207, the book binding application 104 subsequently fills a transparent gray color over the target page. In steps S2205 and S2208, when this processing is subsequently executed for each of the pages, all the pages to be printed when the pages are presently printed finally come to have a background color of white, whereas all the pages which are not printed (i.e., pages to which the inserter is designated) come to have a background color of gray. Accordingly, the pages to be printed and the pages not to be printed when the printing is performed with a monochrome printer can be discriminated each other with ease.

Meantime, the above described colors, i.e., the white and the gray, are mere examples. If the user can discriminate the page to be printed from the page not to be printed, the book binding application 104 may display-control each of the pages with other methods. In a case where the page to be processed is a blank page (in a case where there is no print content), in step S2206, no print content is drawn as a matter of course. Execution of the processing illustrated in FIG. 22 enables a display of a preview image as illustrated in FIG. 23.

Figure 23A:
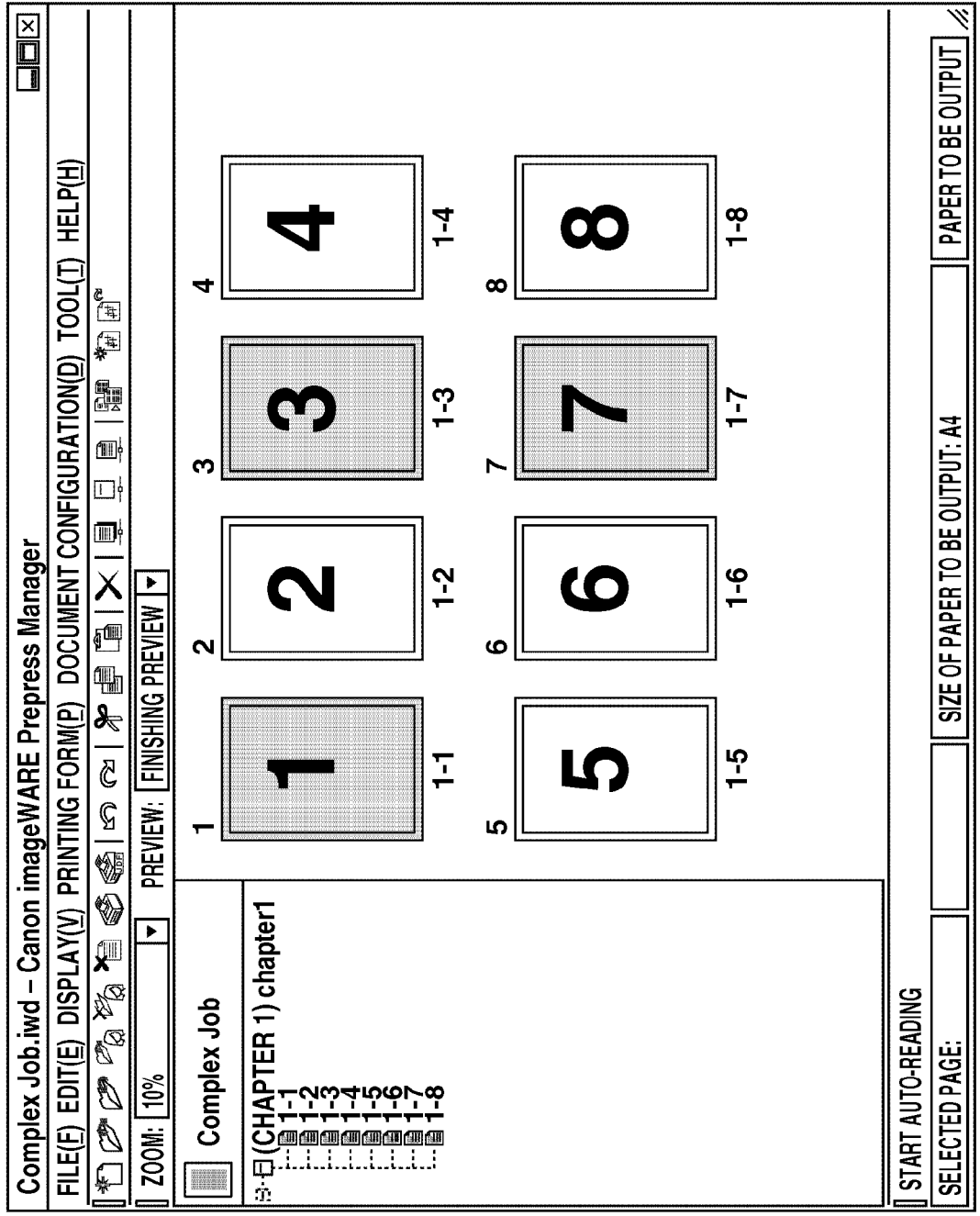
FIG. 23 illustrates an example of preview display distinctly displaying paper sheets to which the inserter is designated as the paper feed unit.

FIG. 23A illustrates a preview screen in a case where the paper feeding by the inserter is set for the first, third, and seven pages in the window for page setting of FIG. 20. As described above, the print contents of the pages (i.e., the numbers 1, 3, and 7) are displayed also with respect to the pages fed from the inserter. At the same time, in order to clearly represent that the pages fed from the inserter are not to be printed, the entire pages thereof are painted out with a transparent gray color. Accordingly, the user can confirm the content of each of the pages also with respect to the pages to be inserted from the inserter (i.e., the pages that are currently not to be printed). Further, since the pages have different background colors, such an effect can be produced that the user can recognize that the first, the third, and the seventh pages are not the pages to be printed (but the pages are to be inserted).

The book binding application 104 according to the present exemplary embodiment provides such a function to collectively set the paper feed unit to the "inserter" with respect to all the color pages contained in the document data. When the user designates a menu 2301 for "setting the paper feed unit of all the color pages to the inserter" as illustrated in FIG. 23B, the book binding application 104 searches all the color pages contained in the document data, and sets the paper feed unit of the searched pages collectively to the inserter. Accordingly, when the user desires to print monochrome pages while the color pages having been printed are inserted between the monochrome pages from the inserter, the user can change the setting so that only the color pages are inserted from the inserter with ease.

<Printing of Preprinted Sheet>

Now, a method for setting a printable range in a case where the printing is performed by using the book binding application 104 is described below. The book binding application 104 can designate the printable range by using a binding unit (i.e., a bundle) in a case where the binding printing is designated as a printing method.

The book binding application 104 can designate a printable range by a chapter unit, a print page unit, or a sheet unit (i.e., a physical page unit) in a case where a one-sided printing or a two-sided printing is designated. As a matter of course, the book binding application 104 can designate the entire document as a print target in any of the print methods.

The book binding application 104 can also designate the printable range by the insert sheet unit in a case where a use of the insertion sheet to be inserted from the inserter with respect to a specific page is set. Accordingly, in the document data, only the pages, which is printed on the insertion sheet inserted from the inserter (i.e., creation of a preprinted sheet), are printed at a time.

In order to set print setting of this book file, the user selects a file menu from the UI screen 700 and designates "printing" in the file menu. Accordingly, a print setting screen 1200 of FIG. 12 is displayed.

The print setting screen includes the number of copies 1201 and a method for designating the printable range 1202. The number of copies 1201 can be designated free from the print method. In the method for designating the printable range 1202, different items are designated according to setting of the print method.

Figure 12:
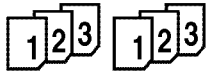
FIG. 12 illustrates an example of a user interface screen for executing printing after a print range is set.

FIG. 12 illustrates an example of a print setting screen in a case where the one-sided printing or the two-sided printing is designated as the print method, and an insertion of the insertion sheet from the inserter is set for a specific page. In this case, the user can designate either one of the "document (entire)", the "chapter", the "document page", the "sheet number", and the "insert sheet" as illustrated in FIG. 12.

Designation of the "bundle (brochure)" has a meaning only in a case where the bind printing is designated as the print method, so that the designation of the "bundle (brochure)" is not displayed in this case. The "document (entire)" designates that all the pages included in the book file as the pages to be printed are printed. The "chapter" designates that the pages included in the designated chapter are to be printed. The "document page" designates that the designated page is printed. The "sheet number" designates that the pages to be printed onto the paper sheets of the designated sheet number are to be printed.

The "insert sheet" designates that the pages to which setting is made so as to be inserted from the inserter are to be printed. More specifically, the "insert sheet" is designated when the pre-print sheets are generated. For example, in a case where insertion of only the cover from the inserter is designated, and the "insert sheet" is selected as the print range, only a top page is printed in the document data as the print target.

On the other hand, in a case where insertion of only the "interleaf" from the inserter is designated, and the "insertion sheet" is selected as the printable range, only a top page of each of the chapters is printed in the document data as the print target. Further, in a case that paper feeding by the inserter is set to the selected certain page by using the screen of FIG. 12, and that the "insert sheet" is selected as the print range, the selected certain page is printed.

<Print Processing of Preprinted Sheet>

Figure 13:
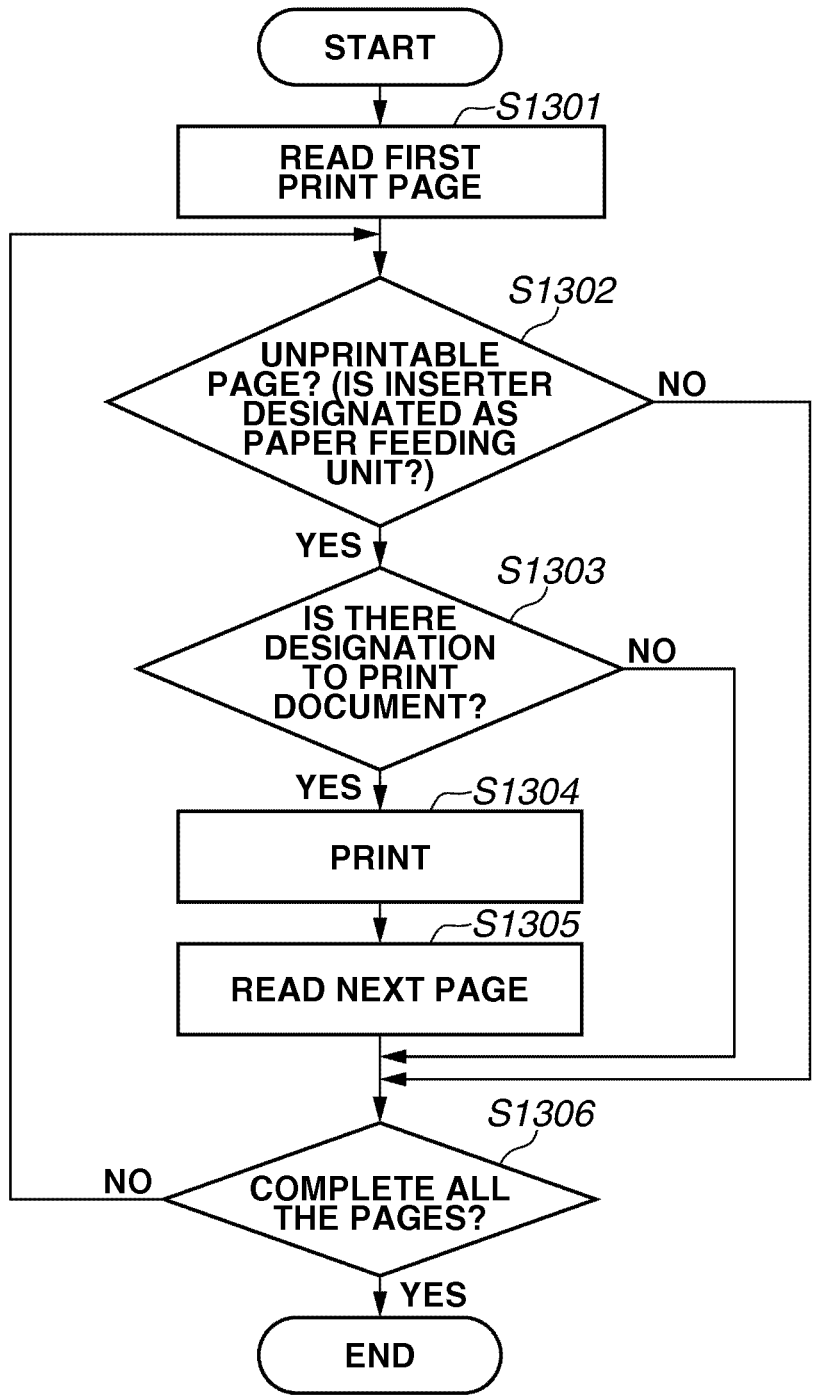
FIG. 13 is a flow chart illustrating, in the book binding application, an example of processing for printing only a preprint sheet at one time.

FIG. 13 is a flow chart illustrating an example of processing for printing only the preprinted sheets (i.e., pages set to be inserted from the inserter) at a time in the book binding application 104.

If the user executes printing under a state that the "insertion sheet" is designated in a method of designating the printable range 1202 in the print setting screen 1200, in step S1301, the book binding application 104 reads page data sequentially from a first page.

In step S1302, the book binding application 104 determines whether or not a paper feeding source of paper to be used in printing this page is the inserter based on attribute information of the read page. When the book binding application 104 determines that the paper feed unit is not the inserter (NO in step S1302), the book binding application 104 does not print the page.

On the other hand, When the book binding application 104 determines that the paper feed unit is the inserter (YES in step S1302), in step S1303, the book binding application 104 determines whether or not printing of the document is designated for the page. In other words, the book binding application 104 determines whether or not the check box 802 or the check box 804 of the "cover/interleaf setting" window of FIG. 8 is ON.

When printing of a document is designated (YES in step S1303), in step S1304, the book binding application 104 issues an instruction for printing a page. When printing of a document is not designated (NO in step S1303), the book binding application 104 does not print a page. More specifically, the book binding application 104 extracts from the document data a page, to which the inserter is designated as the paper feed unit and printing of the document is designated, and instructs to the image forming apparatus to print the page.

If this processing is sequentially executed for each of the pages (steps S1305 and S1306), only the pages (i.e., the preprinted sheets) to which the setting is made so as to insert the page from the inserter can be printed at a time.

<Preview of Preprinted Sheet>

The book binding application 104 has a preview mode for classifying the preprinted sheets and displaying only preprinted sheets (i.e., pages which are set to be inserted from the inserter).

Figure 14:
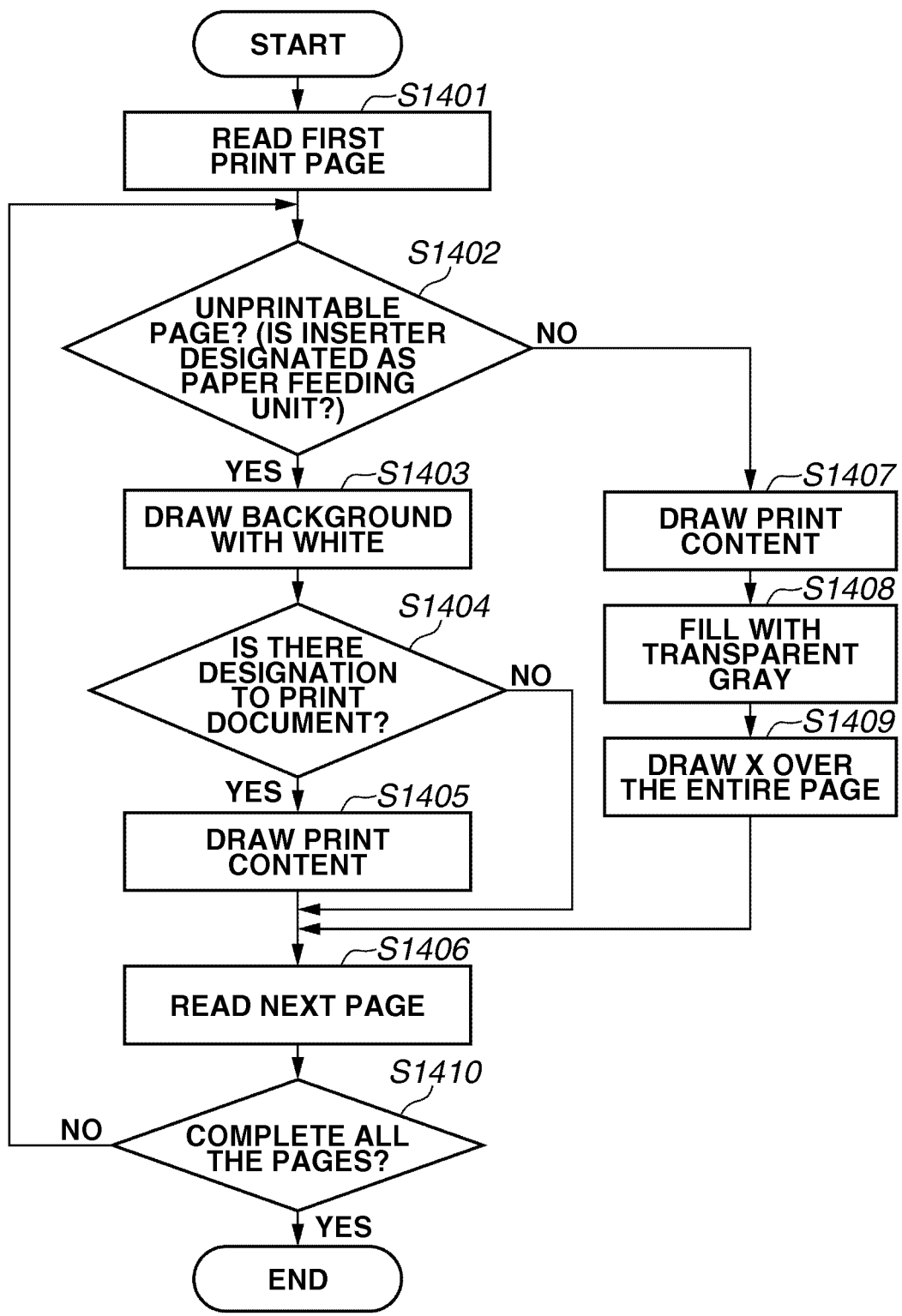
FIG. 14 is a flow chart illustrating an example of processing for displaying the preprinted sheet distinctly from the other sheets.

FIG. 14 is a flow chart illustrating an example of processing that the print preview mode in the book binding application 104 illustrated in FIGS. 5A and 5B is expanded. The processing in which the preprinted sheets (i.e., the pages set so as to insert the pages from the inserter) are classified and displayed.

In step S1401, the bookbinding application 104 reads page data sequentially from a first page. In step S1402, the bookbinding application 104 determines whether or not the paper feed unit for printing this page is the inserter based on attribute information of thus read page.

When the book binding application 104 determines that the paper feed unit is the inserter (YES in step S1402), in step S1403, the book binding application 104 sets a white color as a background color of the page. In step S1404, the book binding application 104 determines whether or not printing of the document is designated for the page.

When printing of the document is designated (YES in step S1404), in step S1405, the book binding application 104 draws a print content of the page. When printing of the document is not designated (NO in step S1404), the book binding application 104 does not draw the print content.

On the other hand, in step S1402, When the book binding application 104 determines that the paper feed unit of the page to be decided is not the inserter (NO in step S1402), in step S1407, the book binding application 104 draws a print content of the target page, and in step S1408, further fills a transparent gray color over the target page. Still further, in step S1409, the book binding application 104 draws x over the entire page.

In steps S1406 and S1410, when this processing is repeatedly executed for each of the pages, since only the preprinted sheets finally have the white backgrounds and all the pages other than the preprinted sheets have the gray backgrounds, the user come to be able to differentiate the preprinted sheets at a glance. Still further, since the print content of each of the pages is displayed, the user can recognize the print content with ease.

Figure 15B:
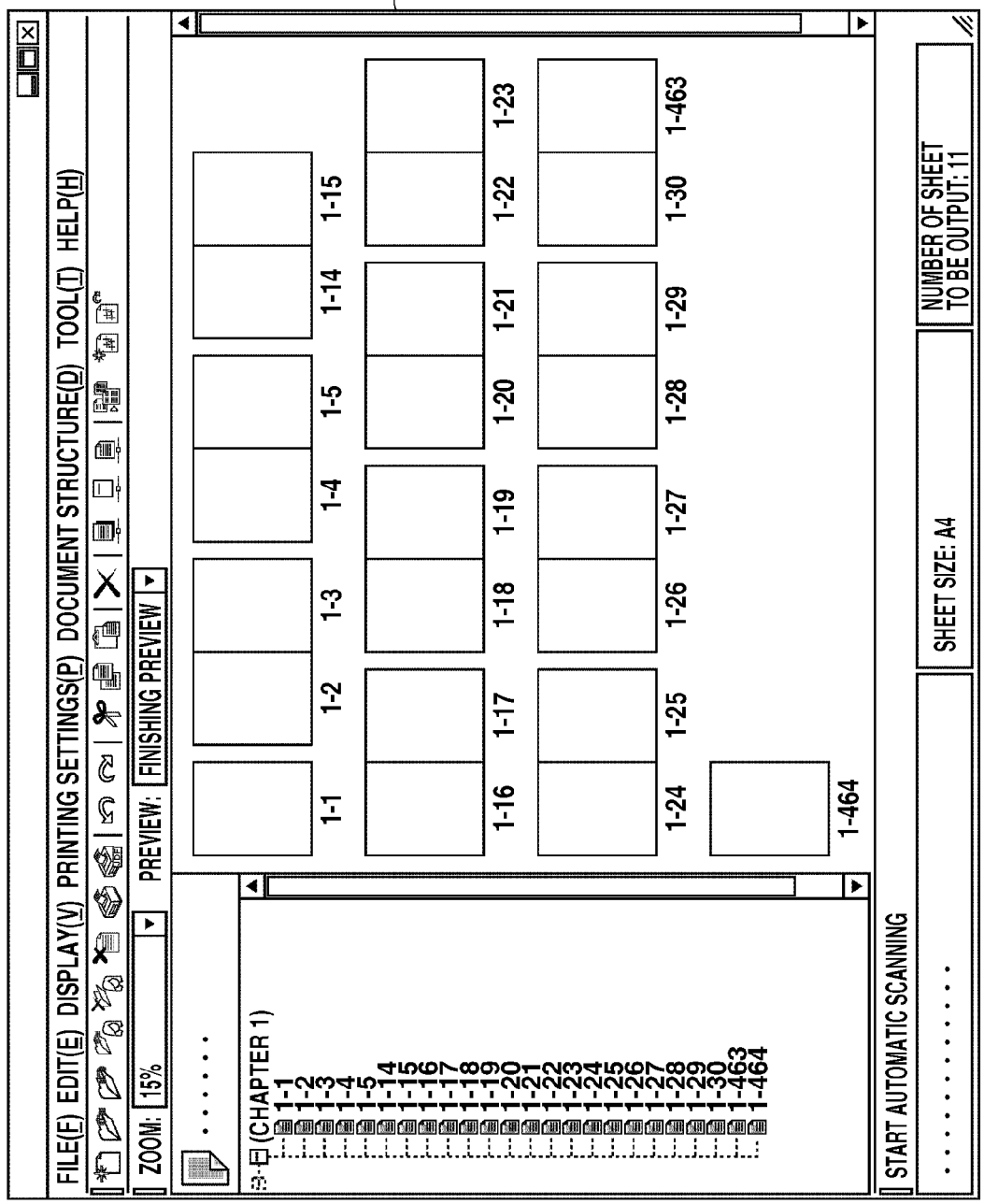

FIGS. 15A and 15B, respectively, illustrates a display example when the user selects the "preprinted sheet preview" as the preview mode in the preview combo box 1501 in the book binding application 104.

More specifically, FIG. 15A illustrates a case where the two-sided printing is set, the cover/interleaf is set to be inserted from the inserter and the check box 802 and the check box 804 are set ON in the "cover/interleaf setting" windows of FIGS. 8A through 8E.

In this case, the print content of each of the pages is displayed for the page to be printed on a paper fed from the cassette (i.e., pages which are not printed on the cover/interleaf) and the page to be printed on a paper fed from the inserter later (i.e., the cover/interleaf (i.e., the preprinted sheets)).

The sheets other than the preprinted sheets are filled with the gray color and provided with x marks. Accordingly, in the print setting screen 1200 of FIG. 12, the user can recognize the pages to be printed with ease when the user designates the "insertion sheet" in the method for designating the printable range 1202.

FIG. 15B illustrates an example of a case of a case binding print. FIG. 15B is a display example of a case where the cover is set to be inserted from the inserter. In FIG. 15B, similar to FIG. 15A, the user can clearly differentiate the "preprinted sheets".

<Printing of Job Information Sheet>

The book binding application 104 has a function for printing the "job information sheet" for specifying a processing content of a post-processing step to be executed by a near-line finisher for printed matters. Instruction information of finishing to the near-line finisher is printed on the "job information sheet" in order to cause the near-line finisher to perform only finishing processing such as stapling and bookbinding among the detailed settings set by the book binding application 104.

In other words, a post-processing instruction to the near-line finisher is described on the job information sheet. The instruction information may be printed in the form of a text or a barcode.

After the user sets the printed matter to the near-line finisher, the user causes the near-line finisher to read the job information sheet, thereby enabling to cause the near-line finisher to perform desired finishing processing for the printed matter.

The user selects a file menu from the UI screen 700 of the book binding application 104. Then, in a case where the user selects a "JDF output (i.e., a JDF printer+near-line finisher)" to execute printing, the job information sheet is (finally) output to a paper discharge cassette of the printer together with the printed matter. At the time, the book binding application 104 transmits a post-processing content and a job identification (ID) to the near-line finisher.

In printing the job information sheet, the sheet identical to a top page of the printed matter is used. A print content of the top page of the printed matter is printed on a background of the job information sheet, and information such as the "job ID", a "job name", and a "user name" is printed on a predetermined sized block area.

In other words, the user carries the printed matter to the near-line finisher, and inputs the job ID of the printed matter to the near-line finisher. Accordingly, the post-processing content of the job ID is read from a memory of the near-line finisher and executed. The post-processing content to be actually executed may be printed on the job information sheet.

In a case where the case binding is set as the setting of the finishing to the book file, a job information sheet is output for the cover and the body of the book, respectively, i.e., total two job information sheets are output. In this case, the content of the block area of the job information sheet is as what is described above. An image including the cover and a print content of the first page of the body of the book arranged side by side is printed as a background image.

In a case where the setting is made so as to insert the cover from the inserter, if the printing of the document is designated in the check box 802 of FIG. 8, an image including the cover and the print content of the first page of the body of the book arranged side by side is printed as the background image. In a case where printing of the document is not designated, only the print content of the first page of the body of the book is used as the background image.

Figure 16A:
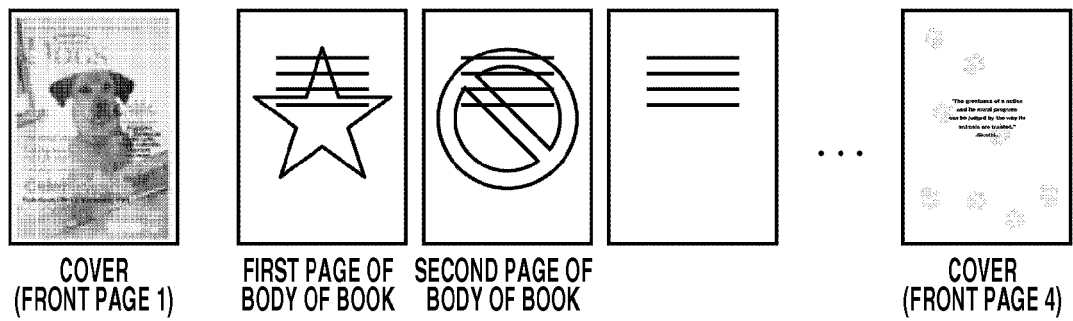
FIGS. 16A through 16C, respectively, illustrate an example of a job information sheet.
Figure 16B:
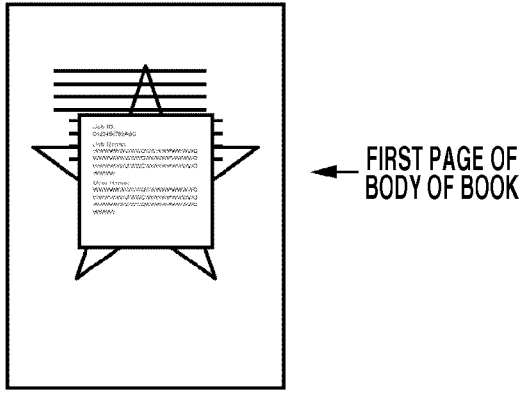
Figure 16C:
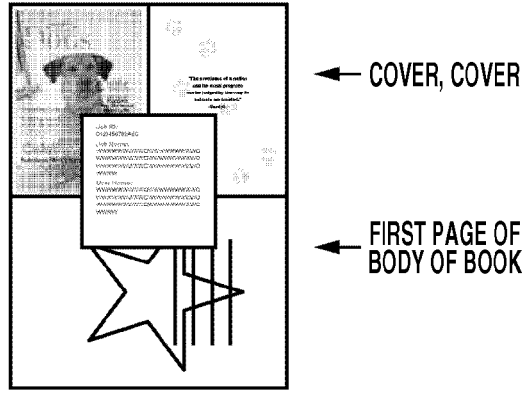

The above described processing enables the user to determine at a glance for which printed matter the job information sheet is created. Even when the cover (i.e., the preprinted sheet) and the "body of the book" from the same final product are printed by the respective printers at different timings, the user can determine which "cover" is to be combined with which "body of the book" by checking the background of the job information sheets with ease. FIGS. 16A through 16C, respectively, illustrate an example of the job information sheet.

<Generation Processing of Job Information Sheet>

Figure 17:
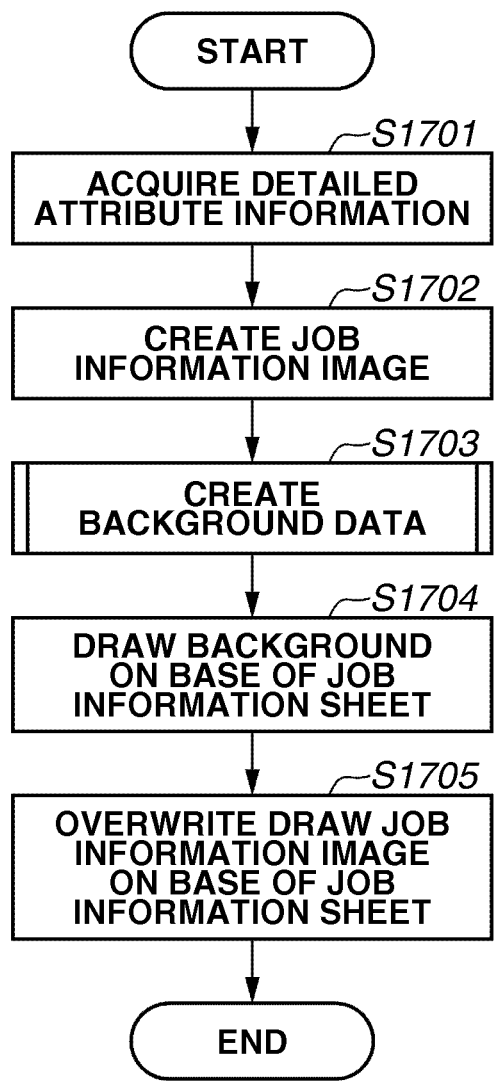
FIG. 17 is a flow chart illustrating an example of processing for generating a job information sheet in the book binding application.

FIG. 17 is a flow chart illustrating an example of processing for generating the job information sheet in the book binding application 104. When the book binding application 104 reads detailed attribute information from the book file in step S1701, then, in step S1702, the bookbinding application 104 generates a "job information image" in which the "job ID", the "job name", and the "user name" are described based on the detailed attribute information.

In step S1703, the book binding application 104 generates "background data" to be used as a base of the job information sheet. In step S1704, the bookbinding application 104 draws the "background data" on the base of the job information sheet.

Finally, in step S1705, the bookbinding application 104 draws the job information image generated in step S1702 on the base of the job information sheet so as to overwrite the job information image. Then, generation processing of the job information sheet is ended.

Figure 18:
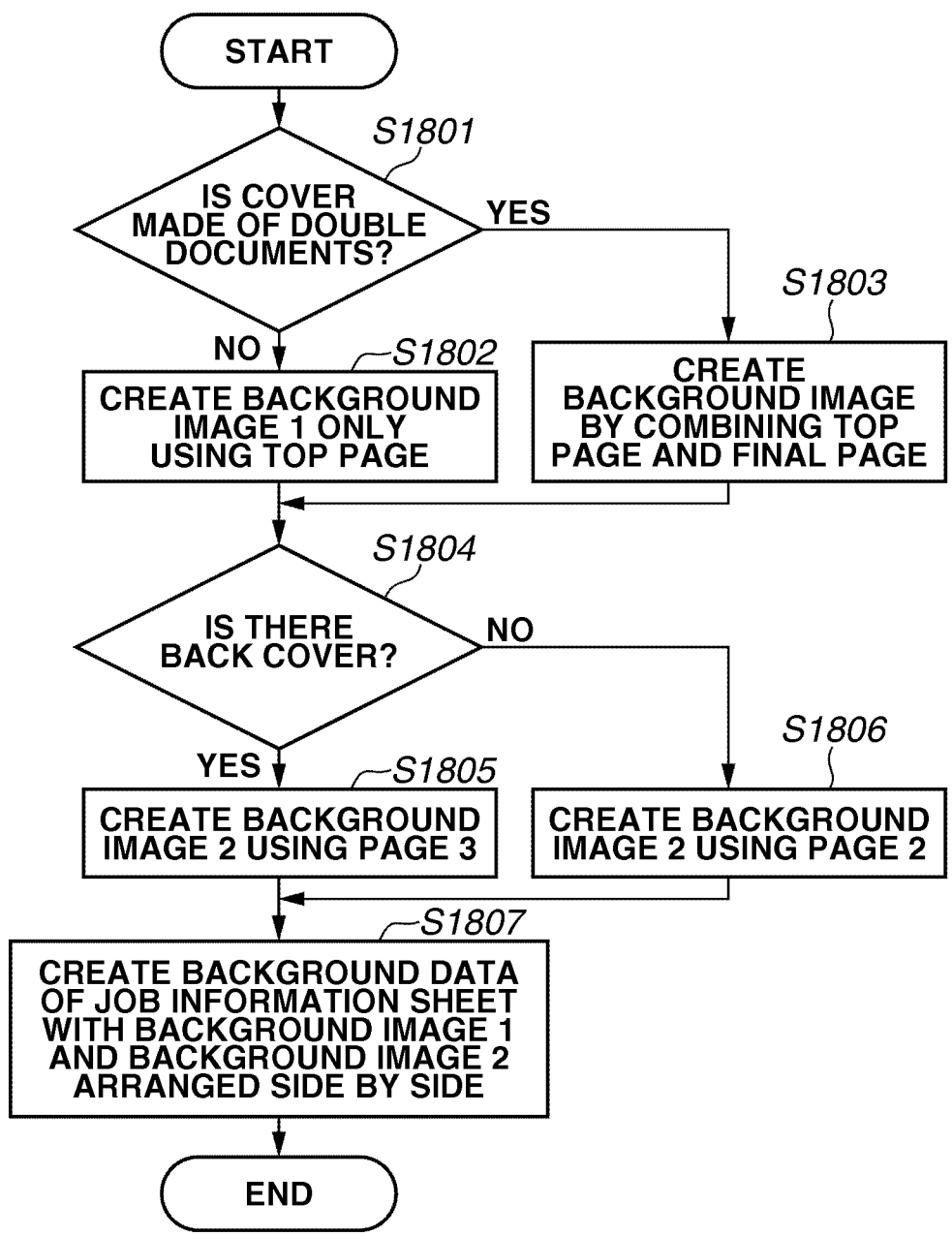
FIG. 18 is a flow chart illustrating an example of processing for generating "background data" performed in step S1703 of FIG. 17.

FIG. 18 is a flow chart illustrating an example of generation processing of the "background data" in step S1703 of FIG. 17. The book binding application 104 creates a background image 1 by using a print content of the cover.

In step S1801, in order to create the background image 1, the book binding application 104 reads the attribute information of the cover from the book file, and determines whether the cover is set to 2-imposition setting (i.e., is set in such a manner that two documents are combined to create the cover data).

When the cover is set to the two-imposition setting (YES in step S1801), in step S1803, the bookbinding application 104 creates the background image 1 by combining a top page and a final page of the book file. On the other hand, When the cover is not set to the two-imposition setting (i.e., when a document having a cover size is set to cover data as it is) (NO in step S1801), in step S1802, the bookbinding application 104 creates the background image 1 only by using the top page of the book file.

Subsequently, the book binding application 104 creates a background image 2 by using the print content of the first page of the body of the book.

In step S1804, the book binding application 104 determines whether or not the back cover is set. When the back cover is set (YES in step S1804), in step S1805, the bookbinding application 104 creates the background image 2 by using data of a third page. When the back cover is not set (NO in step S1804), in step S1806, the bookbinding application 104 creates the background image 2 by using data of a second page.

As described above, the bookbinding application 104 creates the background image 2 by using the print content of the first page of the body of the book.

In step S1807, the book binding application 104 finally completes background data of the job information sheet by arranging the background image 1 and the background image 2 side by side.

<Top Page Thumbnail Image Transmission>

The book binding application 104 has a function for generating a thumbnail image by using the top page of the book file and for transmitting the thumbnail image to the near-line finisher.

The "thumbnail image" is an image that the book binding application 104 transmits to the near-line finisher in a case where the book binding application 104 causes the near-line finisher to perform only the finishing processing such as the stapling and binding from among the detailed setting set by the book binding application 104.

Because of the transmission of the "thumbnail image", the user can easily check the printed matter before subjected to the post-processing output by the book binding application 104 with finishing instruction information that the book binding application 104 transmits to the near-line finisher.

The user selects the file menu from the UI screen 700 of the book binding application 104, and further selects the "JDF output (i.e., the JDF printer+near-line finisher)" to execute printing. Then, the book binding application 104 transmits the finishing instruction information to the near-line finisher together with the thumbnail image.

In a case where the printing of the document is designated in the check box 802 of FIG. 8 even if the setting is made so as to insert the cover from the inserter, the book binding application 104 creates the thumbnail image by using the data of the cover, and transmits the thumbnail image to the near-line finisher.

<Preview by Unit of Paper Feed Unit>

Figure 19A:
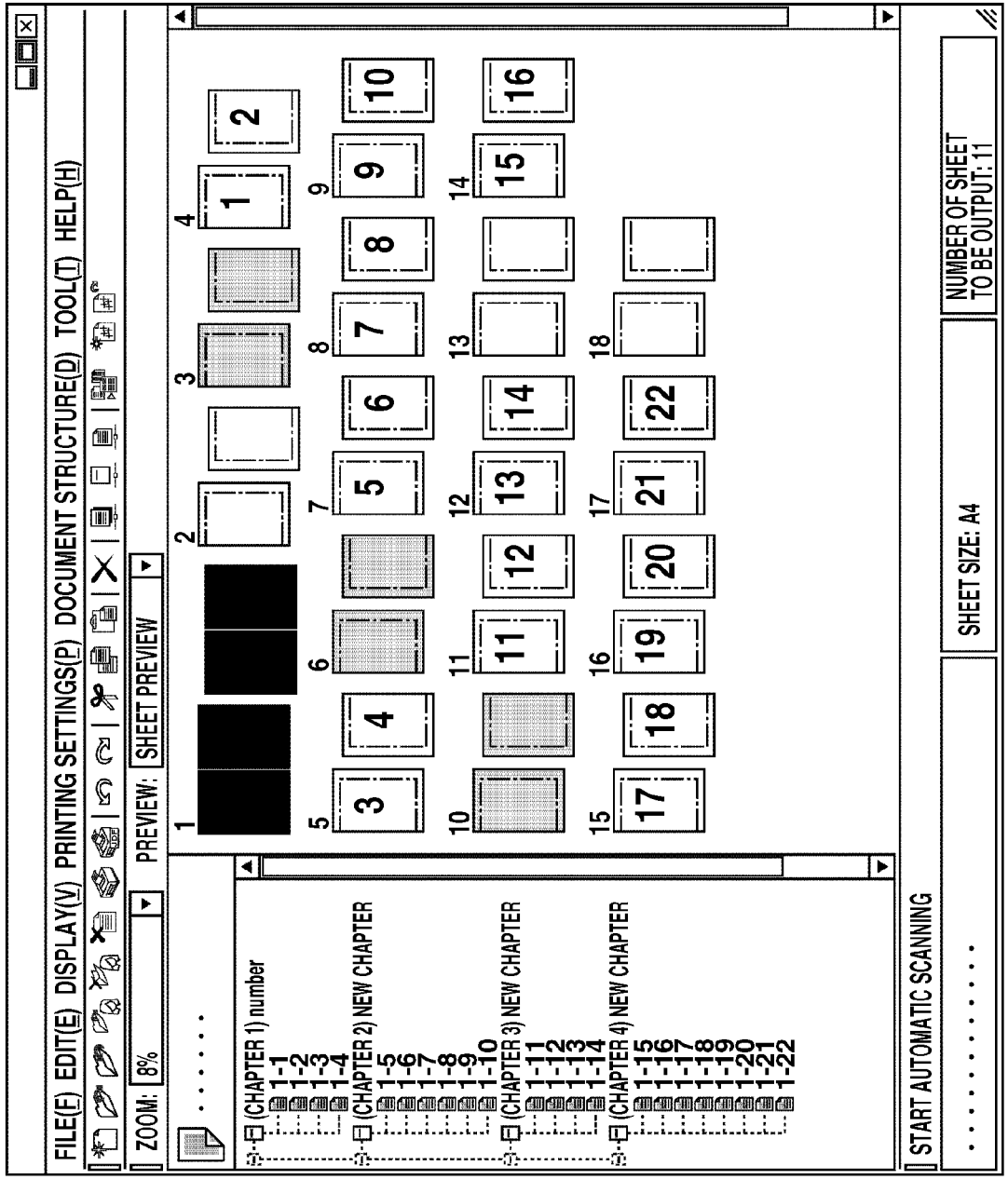

FIGS. 19A and 19B, respectively, illustrate an example of a preview, as illustrated in FIG. 11, that the print preview in a case where the cover and the interleaf are set to be inserted from the inserter is expanded.

In FIG. 19A, a type of the sheet to be fed from the inserter is displayed separately in a manner similar to FIGS. 11A and 11B. In addition to the above, a color (or a design) is discriminated according to the type (i.e., which decks) of the designated inserter paper feeding deck. Accordingly, the user can recognize the pages to which the same inserter paper feeding deck is designated at a glance.

The user may set a color to the inserter paper feeding deck, e.g., according to the type of the inserter paper feeding deck, as the user desires. For example, the user may provide "yellow" to the first deck of the inserter paper feeding deck connected to the image forming apparatus and "pink" to the inserter paper feeding deck of the near-line finisher, respectively.

FIG. 19B illustrates an example in which FIG. 19A is further expanded. In FIG. 19B, each of the pages is displayed so that the page to which a specific paper feeding deck is designated is brightly displayed (or displayed with a specific color) in addition to the display of the sheet to be fed from the inserter to be discriminated.

In this case, the user can designate, by using the list box 1901, the paper feeding deck (or a type of the sheet) which the user desires to discriminate in the preview display among all the paper feeding decks set to the document.

Alternatively, the present invention can also be realized according to an execution of the following processing. More specifically, software (i.e., a program) for realizing the above described functions according the present exemplary embodiment is supplied to a system or an apparatus through the network or various storage media. A computer (a CPU, an MPU, or the like) of the system or the apparatus reads out the program in order to execute the processing.

According to the above described exemplary embodiments, when the document file including the cover, the interleaf, the back cover, and the body of the book is output by using an image forming apparatus or the like, the document file can be easily output together with the insertion sheets. According to the present invention, efficiency of a confirmation processing of the preview image by the user can be enhanced.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-284298 filed Dec. 15, 2009 and No. 2010-254122 filed Nov. 12, 2010, which are hereby incorporated by reference herein in their entirety.

What is claimed is:

1. An information processing apparatus comprising:
a selection unit configured to select a page to be printed by a first print device from document data including a plurality of pages;
a designation unit configured to designate an attribute indicating that a printed matter of the selected page output by the first print device is fed from an inserter of a second print device with respect to the selected page; and a generation unit configured to generate print data so that a page of which attribute is not designated by the designation unit is printed in the second print device according to an instruction for printing document data including the plurality of pages and a printed matter of the page of which attribute is designated by the designation unit is fed from the inserter of the second print device.

2. The information processing apparatus according to claim 1, further comprising:
a display control unit configured to display, in a case where images of a plurality of pages included in the document data are displayed, the images of the pages of which attributes are designated, to be discriminable from the pages of which attributes are not designated.

3. The information processing apparatus according to claim 1, wherein the generation unit, in a case where an insert sheet is designated as a printable range, generates print data based on the page of which attribute is designated.

4. A control method to be executed in an information processing apparatus, comprising:
selecting a page to be printed by a first print device from document data including a plurality of pages;
designating an attribute indicating that a printed matter of the selected page output by the first print device is to be fed from the inserter of a second print device with respect to the selected page; and
generating print data so that the page of which attribute is not designated is printed by the second print device in response to an instruction for printing the document data including the plurality of pages, and the printed matter of the page of which attribute is designated is fed from the inserter of the second print device.

5. The control method according to claim 4, further comprising:
displaying so that pages of which attributes are designated, are displayed to be discriminable from pages of which attributes are not designated, in a case where images of the plurality of pages included in the document data are displayed.

6. The control method according to claim 4, wherein print data is generated based on the page of which attribute is designated in a case where the insert sheet is designated as the printable range.

7. A non-transitory computer-readable storage medium storing computer-executable instructions for controlling an image processing apparatus, which, when executed by a computer, cause the computer to perform operations comprising:
selecting a page to be printed by a first print device from document data including a plurality of pages;
designating an attribute indicating that a printed matter of the selected page output by the first print device is to be fed from the inserter of a second print device with respect to the selected page; and
generating print data so that the page of which attribute is not designated is printed by the second print device in response to an instruction for printing the document data including the plurality of pages, and the printed matter of the page of which attribute is designated is fed from the inserter of the second print device.

8. The non-transitory computer-readable storage medium according to claim 7, further comprising:
displaying so that the pages of which attributes are designated are discriminated from the pages of which attributes are not designated in a case where images of the plurality of pages included in the document data are displayed.

9. The non-transitory computer-readable storage medium according to claim 7, wherein the print data is generated based on the page of which attribute is designated in a case where an insert sheet is designated as a printable range.

* * * * *